United States Patent
Bhuyan et al.

(10) Patent No.: US 11,200,374 B2
(45) Date of Patent: Dec. 14, 2021

(54) METHODS TO CREATE AND USE RESPONSIVE FORMS WITH EXTERNALIZED CONFIGURATIONS AND ARTIFACTS

(71) Applicant: Intuit Inc., Mountain View, CA (US)

(72) Inventors: Ranadeep Bhuyan, Bangalore (IN); Shashank Aggarwal, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/670,111

(22) Filed: Oct. 31, 2019

(65) Prior Publication Data
US 2021/0089619 A1   Mar. 25, 2021

(30) Foreign Application Priority Data
Sep. 19, 2019   (IN) .............................. 201921037811

(51) Int. Cl.
*G06F 16/22*   (2019.01)
*G06F 40/186*   (2020.01)

(52) U.S. Cl.
CPC ........ *G06F 40/186* (2020.01); *G06F 16/2246* (2019.01)

(58) Field of Classification Search
CPC ............................ G06F 40/186; G06F 16/2246
USPC ......................................................... 715/223
See application file for complete search history.

(56) References Cited

U.S. PATENT DOCUMENTS

| | | | | |
|---|---|---|---|---|
| 2011/0093769 A1* | 4/2011 | Dunn | ...................... | G06F 40/14 715/221 |
| 2014/0304581 A1* | 10/2014 | Stolte | .................... | G06F 16/283 715/215 |
| 2016/0092091 A1* | 3/2016 | Hanson | ................. | G06F 40/106 715/763 |
| 2018/0046609 A1* | 2/2018 | Agarwal | .................. | G06F 8/38 |

* cited by examiner

*Primary Examiner* — Hope C Sheffield
(74) *Attorney, Agent, or Firm* — Ferguson Braswell Fraser Kubasta PC

(57) ABSTRACT

Displaying a template of a document in a GUI. The template includes displayed sections. The sections includes at least one configuration defined by conditions, which are defined by rules. The sections are defined by a distinct set of conditions defined by a distinct set of rules. The configuration, conditions, and rules are stored separately from the template and from each other. When modifying the template, at least one of a condition change and a rule change required to implement the change to the template is identified. At least one of a modified condition and rule is retrieved. The first configuration is updated by modifying at least one of the conditions and the rules using at least one of the revised condition and the revised rule. The second configuration for the GUI is rendered to form a modified template. The modified template is displayed on the graphical user interface.

17 Claims, 16 Drawing Sheets

Test_US_APE  8509444444  900B
Mountain View, CA 94043  iamtestpass@intuit.com
US  www.website.com
    ↖                        906B ↘
    904B

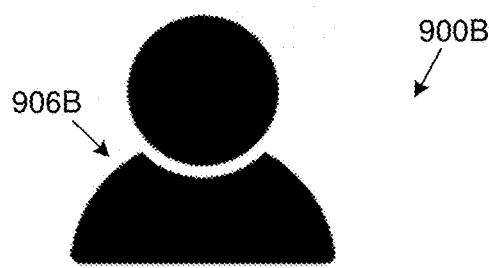

Duplicate Tax Invoice

BILL TO        SHIP TO            INVOICE #   1001        TRACKING NO  123
shashank       SHiping address    DATE        09/29/2017  TERMS        Net 30
                                  SHIP DATE   09/29/2017  DUE DATE     10/29/2017
                                  SHIP VIA    123

GST
cs1val

ACCOUNT SUMMARY

| 03/03/2015 | Balance Forward | | | | 225.00 |
| | Payments and credits between 03/03/2015 and 04/25/2015 | | | | 225.00 |
| | New charges (details below) | | | | 225.00 |
| | Total Amount Due | | | 902B ↘ | 225.00 |

| DATE | ACTIVITY | QTY | RATE | AMOUNT | DUE |
|---|---|---|---|---|---|
| | Week starting 09/04/2017 | | | | 10% of 100.00 |
| 09/06/2017 | Hours | 14 | 14.00 | 196.00 | 10% of 100.00 |
| | Subtotal: Week starting 09/04/2017 | | | 196.00 | 10% of 100.00 |
| | | | | | 10% of 100.00 |
| | Week starting 09/25/2017 | | | | 10% of 100.00 |
| 09/27/2017 | Services | 11 | 11.00 | 121.00 | 10% of 100.00 |
| 09/29/2017 | Hours | 12 | 12.00 | 144.00 | 10% of 100.00 |
| | Subtotal: Week starting 09/25/2017 | | | 265.00 | 10% of 100.00 |

Some message

ESTIMATE SUMMARY                        SUBTOTAL       461.00
                                        DISCOUNT 2%    -9.22
Estimate #1001       $100.00            SHIPPING       12.00
Invoice #1003        $0.00              TOTAL          463.78
This invoice #1001   $443.78            DEPOSIT        20.00
Total invoiced       $0.00              BALANCE DUE    $443.78

(Authorization signature)

Test_IN_INP-
FRE_1_201811271543318283081

2500 Garcia Ave
SomeCity, Kamataka 12345 IN
test154331824_iamtestpass@sharklasers.
com

INVOICE NO.1001

INVOICE TO
Girish

| DATE | 27/11/2018 |
|---|---|
| TERMS | Net 30 |
| DUE DATE | 27/12/2018 |

| SERVICE | QTY | AMOUNT |
|---|---|---|
| Hours washing car | 2X ₹100 | ₹200.00 |
| Services service accessories | 1X ₹500 | ₹500.00 |
| Battery 12V Excide 12V | 1X ₹1200 | ₹1,200.00 |
| Shampoo Amway 100ml | 2X ₹150 | ₹300.00 |
| BALANCE DUE | | ₹2,200.00 |

*FIG. 9D*

1000A configuration 1:

```
"componentName":"activityTableSection",
    "componentType":"ComponentType::LayoutHorizontal",
    "children":[
     {
       "componentName":"activityTable",
       "componentType":"ComponentType::Table",
       "styles":{
         "header":{
           "fontColor":"#0d909a",
           "fontSize":1,
           "backgroundColor":"#c5dfff",
           "lineHeight":1.5
         },
         "content":{
           "fontSize":1.1
         },
         "headerContentSpacing":5,
         "rowSpacing":5,
         "showBorders":false
       },
       "columns":[
        {
          "id":"srNo",
          "headerValue":"Sr. No.",
          "styles":{
            "width":"9%"
          }
        },
        {
          "id":"date",
          "headerValue":"Date",
          "styles":{
            "width":"2%"
          }
        },
```

*FIG. 10A*

Configuration 2

1000B

```
"componentName":"headerSeparatorComponent",
    "componentType":"ComponentType::LayoutHorizontal",
    "children":[
      {
        "componentName":"headerSeparator",
        "componentType":"ComponentType::SeparatorHorizontal",
        "styles":{
          "color":"#babec5",
          "thickness":1,
          "verticalSpacing":10,
          "style":"dashed"
        }
      }
    ]
  },
```

*FIG. 10B*

Configuration 3

1000C

```
"componentName":"paymentContainer",
    "componentType":"ComponentType::LayoutVertical",
    "styles":{
      "backgroundColor":"${@foregroundColor}20",
      "marginTop":10,
      "marginBottom":10
    },
    "children":[
      { xxx},
      { xxxx}
    ]
```

*FIG. 10C*

Name Lists – example     1100A type: Key value pairs : Example - 1

"componentName": "subtotalAmountLabel",
   "componentType": "ComponentType::Text",
   "value": "SAMPLE_LABEL",
   "fontColor": "#8d989a"

Conditional Name lists, example -2

Based on that Conditional Name lists can exists
*ComponentType == Number ? "subtotalAmount" -> ComponentName : "subtotalAmountLabel" -> ComponentName*

Example -3
"componentType": "ComponentType::StampText",
"className": "watermark",
"fontWeight": "bold",
"fontSize": 2.5,
"fontColor":"#0A9928"

1100B

Example default NameLists in a Rule
"defaultProperties":[
   "fontColor":"#000",
   "fontSize":12,
   "fontFamily":"HelveticaNeue",
   "layoutDirection":"vertical",
   "foregroundColor":"#d9f2fd",
   "margin":{ xxxx}
]

*FIG. 11B*

1100C $N_1$: font: times new roman
$N_2$: Rotate -30% to Parent component
$N_3$: Weight: bold
$N_4$: Weight: bold
$N_5$: Weight: bold
$N_6$: if C1 belongs to Parent? width=90% : width=100%
$N_7$: background-color=#CA6B70
$N_8$: Stack: bottom to top
$N_9$: Stack: Top to bottom
$N_{10}$: radius: 100em

*FIG. 11C*

```
//doing this for drag-and-drop support
if (child.children && child.children.length) {
    child.children.forEach(function(childCmp) {
        childCmp.componentID = _this.randomId++;
    });
}
if (child.componentName === "summarySection") {
    child.marginLeft = "50%";
    child.width = "50%";
}
if (child.componentType === "ComponentType::Table") {
    child.headerFontColor = _this.templateJsonCopy.defaultProperties.fontColor;
    child.headerBackgroundColor = getBackgroundColor(_this.templateJsonCopy.defaultProperties.fontColor, 0.2);
}
child.className = "draggable-column-component";
```

1200A

```
if (imgRatio >= allowedRatio) {
    newWidth = allowedWidth;
    newHeight = 1.0 / imgRatio * newWidth;
} else if (imgRatio < allowedRatio) {
    newHeight = allowedHeight;
    newWidth = imgRatio * newHeight;
}
```

R1: Apply Parent's CSS according to some Rule (R3)
R2: Set height fixed at 100 of the current layout
R3: all CSS but not font*
R4: force not to apply any parent styles
R5: Break the segment or component into 1020x 860 grids
R6: Not Numeric
R7: Inner text has <1> trailing space
R8: Inner text can be input field          1202B
R9: force Rotate element
R10: text-radius: 50% of layout height [example if "Ci = layout is fixed"]
Where Ci is a condition.

*FIG. 12B*

METHODS TO CREATE AND USE RESPONSIVE FORMS WITH EXTERNALIZED CONFIGURATIONS AND ARTIFACTS

CROSS-REFERENCE TO RELATED APPLICATIONS

This application claims priority under 35 U.S.C. § 119(a) to Indian patent application 201921037811, filed Sep. 19, 2019, and entitled "METHODS TO CREATE AND USE RESPONSIVE FORMS WITH EXTERNALIZED CONFIGURATIONS AND ARTIFACTS", which is incorporated herein by reference in its entirety.

BACKGROUND

A common task for business owners is to create forms, such as invoices, reports, and others. The forms may be rendered as a graphical user interface, allowing a user to manipulate the form by filling out the form, modifying the form, printing the form, etc. However, the process of creating a new electronic form using a computer system is often difficult when the user is not using existing word processing or image processing software. The process is further complicated when a non-word processing, web-based software tool is used to create the form.

Additionally, for most software tools that create one or more forms, the definition of the form is part of the form itself, or the form is entirely defined in a single data repository co-located with the form. Thus, each time a new form is to be created, an entirely new form is defined, even if an old form is recycled or reused in some way. For example, a user may "save as" an old portable document format (PDF), a word processing document, a hypertext transfer markup language (HTML) file, etc. to create a new form or template, but the fact remains that an entirely new form (with a new set of co-located definitions) is created. As a result, multiple documents are commonly stored with only minor differences.

It would be useful to better manage data for the form and render the form more efficiently, relative to the above technique, in terms of memory used (both to create and to store the form) by avoiding redundant data for each form. For example, if only a single line is changed between an old form and a new form, then two documents are stored sharing entirely the same data except for the small difference in the one line between the forms. It would be useful to reduce the amount of computer memory used to store and render the two forms by eliminating or reducing redundant data.

SUMMARY

In general, in one aspect, one or more embodiments relate to a method. The method includes displaying a template of a document in a graphical user interface. The template includes a plurality of sections displayed within the template. The plurality of sections includes at least one configuration including a first configuration. The first configuration is defined by a plurality of conditions. The plurality of conditions is defined by a plurality of rules. Each of the plurality of sections is defined by a distinct set of conditions. Each of the plurality of conditions is defined by a distinct set of rules. The first configuration, the plurality of conditions, and the plurality of rules are stored separately from the template and from each other. The method also includes receiving an instruction to modify the template via a manipulation of the graphical user interface. The method also includes identifying at least one of a condition change and a rule change required to implement the change to the template. The method also includes retrieving at least one of a modified condition and a modified rule useable to implement the at least one of the condition change and the rule change. The method also includes updating the first configuration by modifying at least one of the plurality of conditions and the plurality of rules using at least one of the revised condition and the revised rule. A second configuration is formed. The method also includes rendering the second configuration for the graphical user interface to form a modified template. The method also includes displaying the modified template on the graphical user interface.

The one or more embodiments also relate to a system. The system includes a data repository storing a data structure comprising a plurality of conditions, a plurality of rules, and a plurality of name lists of rules. The data repository further includes a plurality of surfaces within the data structure. The surfaces include a distinct configuration for a corresponding template. The system also includes a computing device configured to receive an input from a remote user device. The input includes a change to the particular template displayed on a graphical user interface of the remote user device. The system also includes a reconfiguration engine executing on the computing device and in communication with the data repository. The reconfiguration engine is configured to receive the input and generate a revised configuration by identifying an updated surface within the data structure that corresponds to input. The system also includes a rendering engine executing on the computing device and in communication with the reconfiguration engine and the remote user device. The rendering engine is configured to render a particular configuration as a particular template on the graphical user interface and to render the revised configuration as a revised template on the graphical user interface. The rendering engine is external to the computing device and the remote user device.

The one or more embodiments also relate to another method. The method includes receiving a request for a modification to a first template rendered on a graphical user interface of a remote user device. The method also includes accessing a data repository. Accessing further includes accessing a data structure comprising a plurality of conditions, a plurality of rules, and a plurality of name lists of rules. Accessing further includes accessing at least one of a plurality of surfaces within the data structure. Each of the plurality of surfaces comprises a distinct configuration for the first template. The first template is renderable on a graphical user interface of a remote user device. The first template includes a first surface of the plurality of surfaces. Each surface includes at least one configuration. Each configuration includes at least one rule. Each rule comprises at least one name list of rules. The method also includes retrieving a second surface, of the plurality of surfaces in the data structure, using an indexing scheme that correlates a state of a section of the first template to the plurality of conditions, the plurality of rules, and the plurality of name lists of rules.

The one or more embodiments also relate to another method. The method includes displaying a template of a document in a graphical user interface. The template includes sections displayed within the template. Each of the sections being defined by a distinct set of conditions and rules, the distinct set of conditions and rules being stored separately from the template and from each other. The method also includes receiving an instruction to modify the template via a manipulation of the graphical user interface. The method also includes identifying at least one of a condition change and a rule change required to implement the change to the template. The method also includes retrieving at least one of a modified condition and a modified rule useable to implement the at least one of the condition change and the rule change. The method also includes modifying at least one of the distinct set of conditions and the rules using at least one of the revised condition and the revised rule. The method also includes rendering the graphical user interface based on the at least one of the revised conditions and rules to form a modified template. The method also includes displaying the modified template on the graphical user interface.

Other aspects of the invention will be apparent from the following description and the appended claims.

BRIEF DESCRIPTION OF DRAWINGS

FIG. 9A, FIG. 9B, FIG. 9C, and FIG. 9D are examples of forms constructed using the data surfaces described in FIG. 6, in accordance with one or more embodiments.

FIG. 10A, FIG. 10B, and FIG. 10C are pseudo-code showing how configurations may be represented for the forms shown in FIG. 9A through FIG. 9D, in accordance with one or more embodiments.

FIG. 11A, FIG. 11B, and FIG. 11C show examples of how name lists may be represented for the forms shown in FIG. 9A through FIG. 9D, in accordance with one or more embodiments.

FIG. 12A and FIG. 12B show examples of how rules may be represented for the forms shown in FIG. 9A through FIG. 9D, in accordance with one or more embodiments.

DETAILED DESCRIPTION

Figure 1:
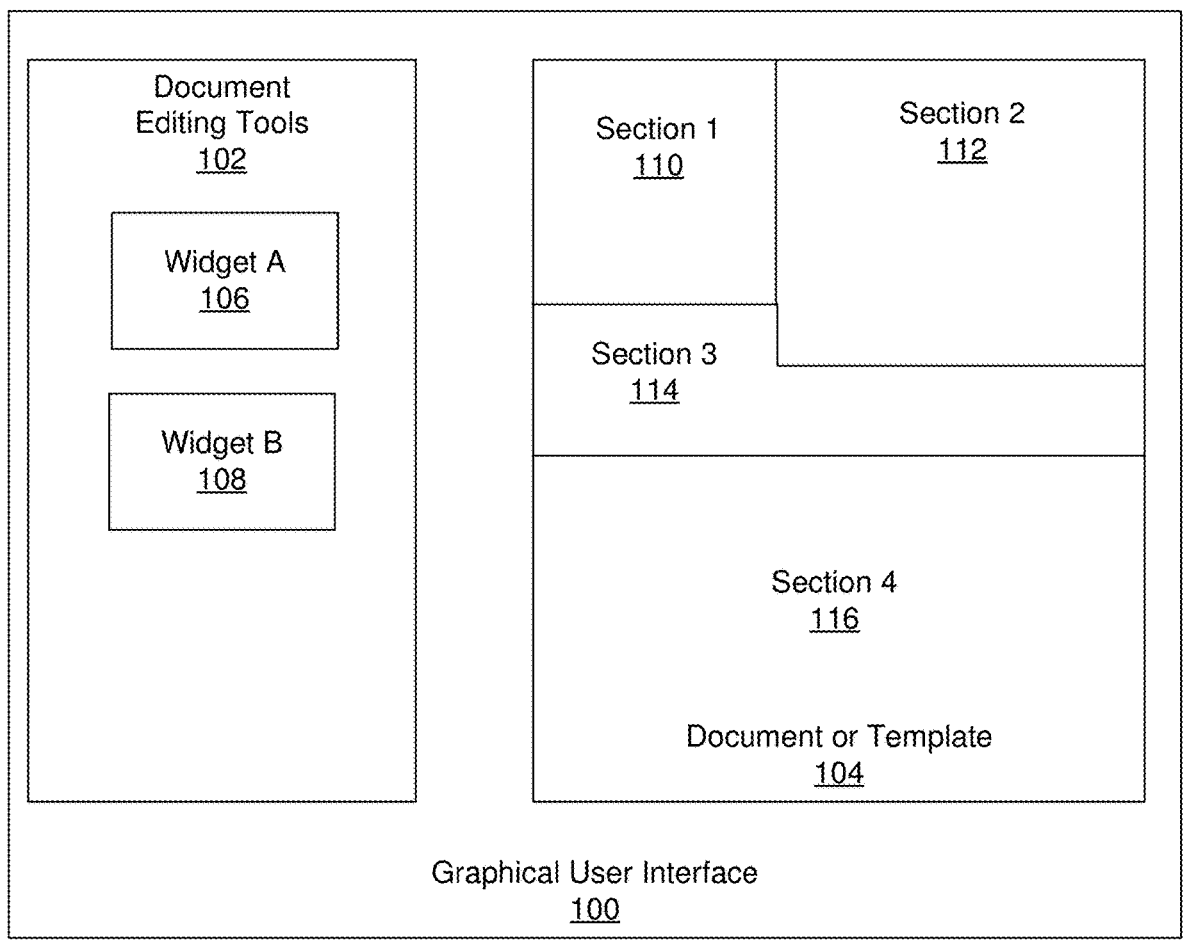
FIG. 1 is an example of a graphical user interface useful for editing, creating, and rendering a form, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments relate to tools for creating and editing electronic forms on a computer while maintaining a separation between the data that defines the form and the form itself. The term "separation" has two meanings, as used herein. The first meaning of "separation" is that the definition of a form is physically stored separately from where the form itself is stored. The second meaning of "separation" is that the form itself is separate from the definition of the form. As used herein, the term "separate" contemplates both meanings of the term, unless explicitly stated otherwise.

One or more embodiments achieve separation though the use of an external rendering engine and an external, multi-dimensional data structure. Each form is divided into sections which has a corresponding configuration of conditions, rules, and name lists assigned to it. When a user uses a tool (e.g., software-based, computerized, electronic, etc.) to create or edit a form, an indexing scheme is used to identify what set of conditions, rules, and name lists in the multi-dimensional data structure are needed to render the changed form. The set conditions, rules, and name lists are referred to as a "surface" of the multi-dimensional data structure. The surface is returned to a rendering engine, which uses the surface to render an edited form on the graphical user interface. In this manner, at least three technical benefits are realized. First, data repetition is avoided, because every new or edited form is merely one or more surfaces indexed to a single multi-dimensional data structure. Thus, the one or more embodiments save memory storage, which translates into reduced physical space needed to store forms and change to forms. Second, because the form and the definition of the form are separated from each other, the forms, as well as the form editing tools, are more flexible and adjustable than prior forms and prior ways of creating and editing electronic forms. Third, the speed at which a computer may edit, create, or process forms is increased because any single change to a form only requires a change to a single section of the form, and further only requires a change to which surface is indexed to the multi-dimensional data structure (as opposed to requiring re-definition of the entire form each time a change to the form is made).

FIG. 1 is an example of a graphical user interface useful for editing, creating, and rendering a form, in accordance with one or more embodiments. Graphical User Interface (GUI) (100) is a rendered by a computer onto a physical display. The GUI (100) includes document editing tools (102) which may be used to change a document or template (104). The document editing tools (102) include one or more widgets, including but not necessarily limited to Widget A (106) and Widget B (108). A widget, otherwise known as a software widget, is an interactive visual tool that triggers software functions. A widget may be a button, a slider, a drop-down menu, etc., with which a user may interact in the GUID (100) in order to trigger software functionality. For example, Widget A (106) may be a "subdivide section" button which will cause the software to subdivide a selected section within the document or template (104). In another example, Widget B (108) may be an "add picture" drop down menu which allows a user to place a picture within a highlighted section in the document or template (104). Many other types of widgets and many different types of widget functions may be present in the document editing tools (102).

The document or template (104) is logically divided into multiple sections, including Section 1 (110), Section 2 (112), Section 3 (114), and Section 4 (116). More or fewer sections may be present. The sections may or may not be visible to the user as sections, though the underlying document editing software will logically treat the document or template (104) as being logically divided into the multiple sections.

From the perspective of the software used to generate and render the document or template (104), each section is defined by a configuration. Each configuration corresponds to a surface of a unified data structure, described further below with respect to FIG. 5 and FIG. 6. Thus, when a widget in the document editing tools (102) is used to alter the document or template (104), what occurs is that the functionality triggered by the widget is applied to a selected section of the document or template (104) which is being manipulated by the user.

The user may or may not be aware of how the document or template (104) is being edited by the underlying software. For example, the user might use a widget to embed a picture in Section 4 (116); however, the user may only see that a picture has been embedded near the bottom of the document or template (104) without knowing that the software treated that area of the document or template (104) as being a separate section.

Thus, from the user's perspective, manipulation of the document or template (104) may be flexible and straightforward. This ease of use (otherwise known as a "user friendly" document editing tool) is enabled at least in part by the division of the document or template (104) into sections, each defined by a separate configuration that is a surface of a single underlying data structure. Further detail regarding the underlying software which enables this functionality is described with respect to FIG. 2 and elsewhere herein.

Figure 2:
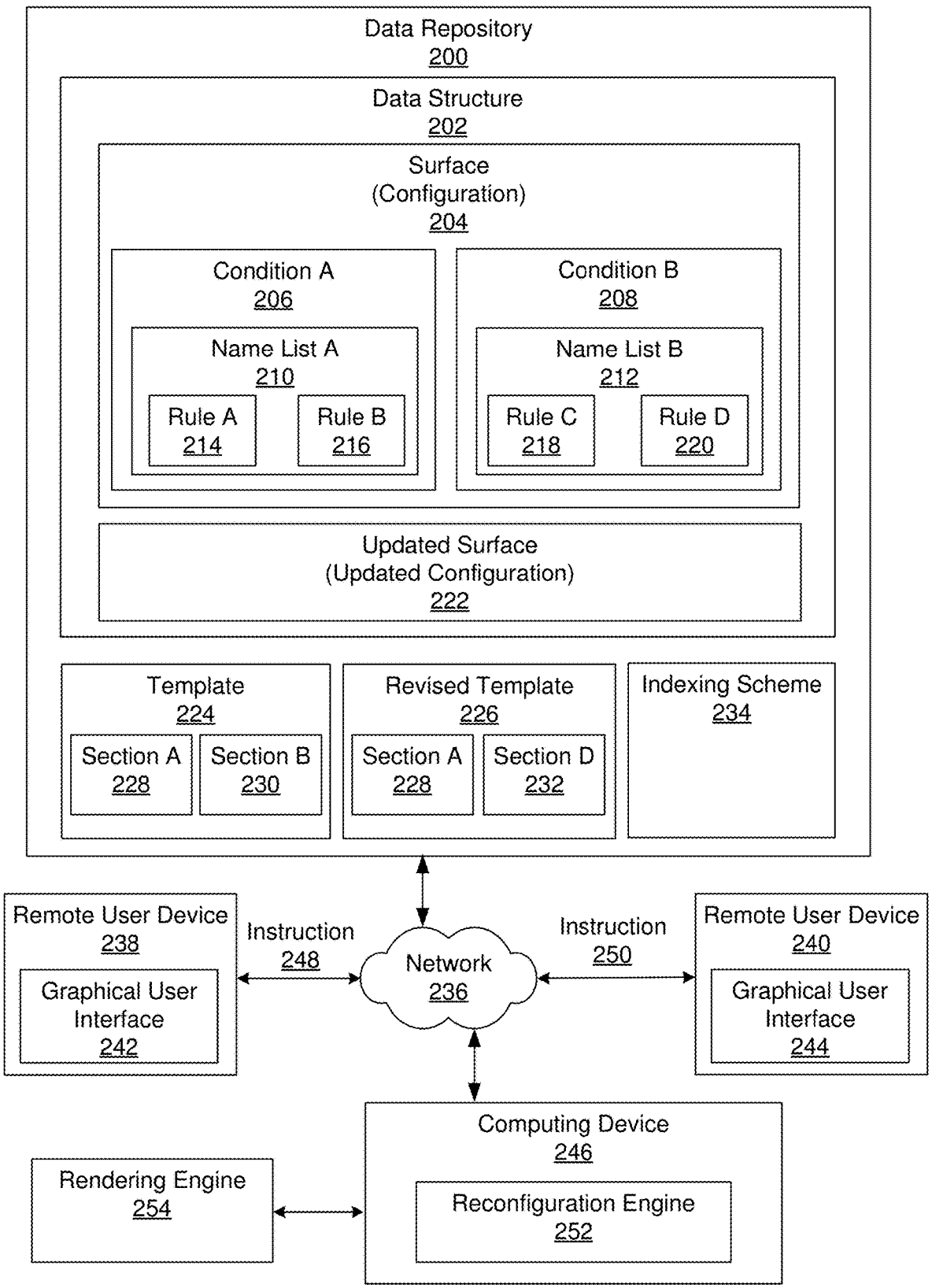
FIG. 2, FIG. 3, and FIG. 4 are systems useable to create, edit, and render forms while maintaining logical and physical separation between the definition of a form and the conditions used to define the form, in accordance with one or more embodiments.
Figure 3:
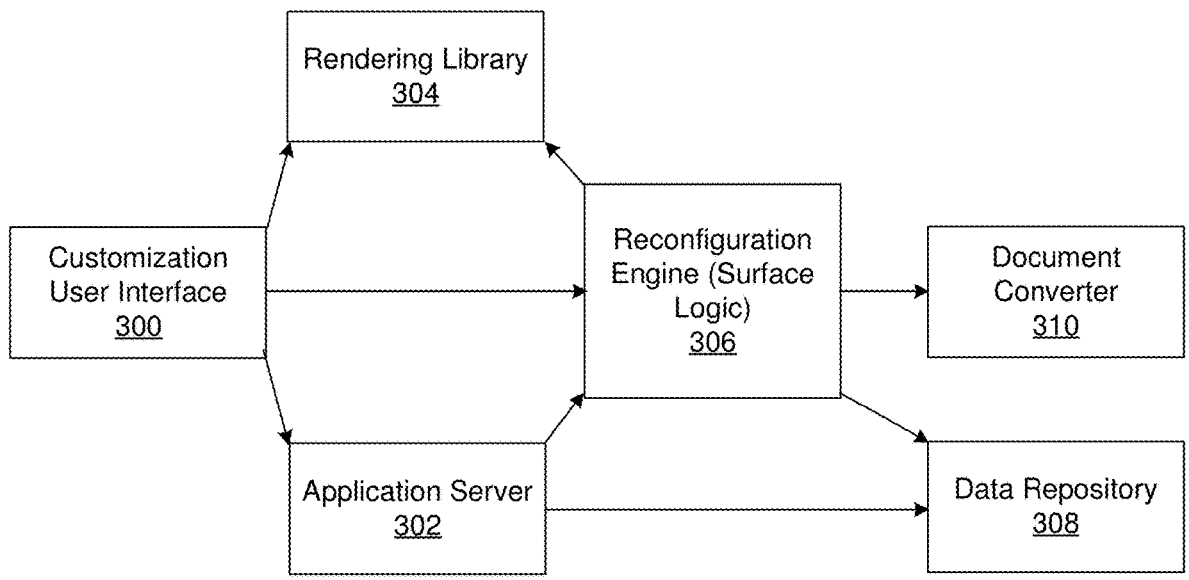
Figure 4:
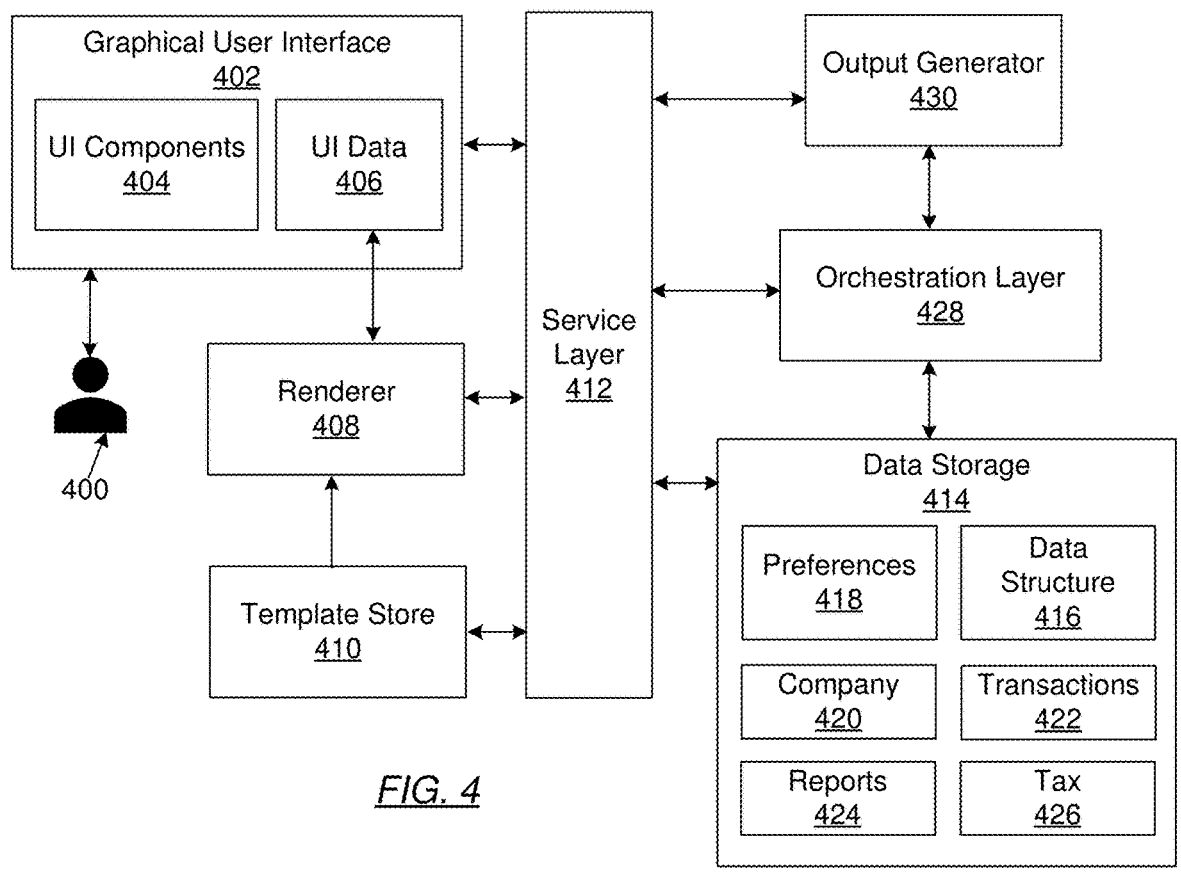

FIG. 2, FIG. 3, and FIG. 4 are systems useable to create, edit, and render forms while maintaining logical and physical separation between the definition of a form and the conditions used to define the form, in accordance with one or more embodiments. The systems shown in FIG. 2, FIG. 3, and FIG. 4 may be used to edit the document or template (104) shown in FIG. 1, and thus may be accessed through the document editing tools (102) shown in FIG. 1.

The system shown in FIG. 2 includes a data repository (200). In one or more embodiments, the data repository (200) stores a number of files and other information. In general, a data repository (200) is a storage unit (e.g., database, file system, or other storage structure) and/or hardware or virtual device (e.g., non-transitory computer readable storage medium, memory, storage server, etc.) for storing data. The data repository (200) may include multiple homogeneous or heterogeneous storage units or devices.

In one or more embodiments, the data repository (200) includes a data structure (202), which may be maintained in a computerized format for organizing, managing, and storing data. The data structure (202) includes data values and may include metadata, such as the relationships among the data values and the functions or operations that may be applied to the data. Examples of data structures include arrays, linked lists, records, unions (such as tagged unions), objects, graphs, trees, b-trees, and others.

In a specific embodiment, the data structure (202) is a multi-dimensional data structure. An example of a multi-dimensional data structure is shown and described with respect to FIG. 6.

The data structure (202) includes surfaces, such as a surface (204). As used herein, a "surface" is not a physical surface, but rather is a definition within the data structure (202) of a condition, a name list, and a rule, with the condition the name list, and the rule each defined along one axis of the data structure (202). Thus, in one embodiment, the surface (204) includes at least those three data items. In the case of a three-dimensional data structure, if visually represented on a three-dimensional graph, the surface would have the appearance of a plane defined within the three-dimensional graph, which is the why the term "surface" may be used. However, again, the surface is not physical, but rather a definition of a particular set of a condition, a name list, and a rule. Conditions, name lists, and rules are described below.

Another term for a surface, as used herein, is a configuration. Thus, for example, a section of a document or a template, such as that shown in FIG. 1, may be defined by a configuration, which may be the surface (204) in the data structure (202).

As mentioned above, surface is defined at least in part by a condition, such as Condition A (206) or Condition B (208). As used herein, a condition is a hierarchical tree of definitions that represents a path of conditional progression to take when rendering an object on a GUI. In one or more embodiments, a condition is a state of a view element based on environment and position of that element. A condition may contain multiple rules. Each rule is to be executed by rendering software after collecting the corresponding name list from an external source. A rule operates on a set of name lists that are external style data with additional actions and logic.

In other words, a condition and a set of rules reflects the "to do" logic to be applied when rendering an object on a GUI. In one or more embodiments, in a particular condition, a set of rules may be defined where the set of rules are to be executed when rendering an object on a GUI.

Figure 7A:
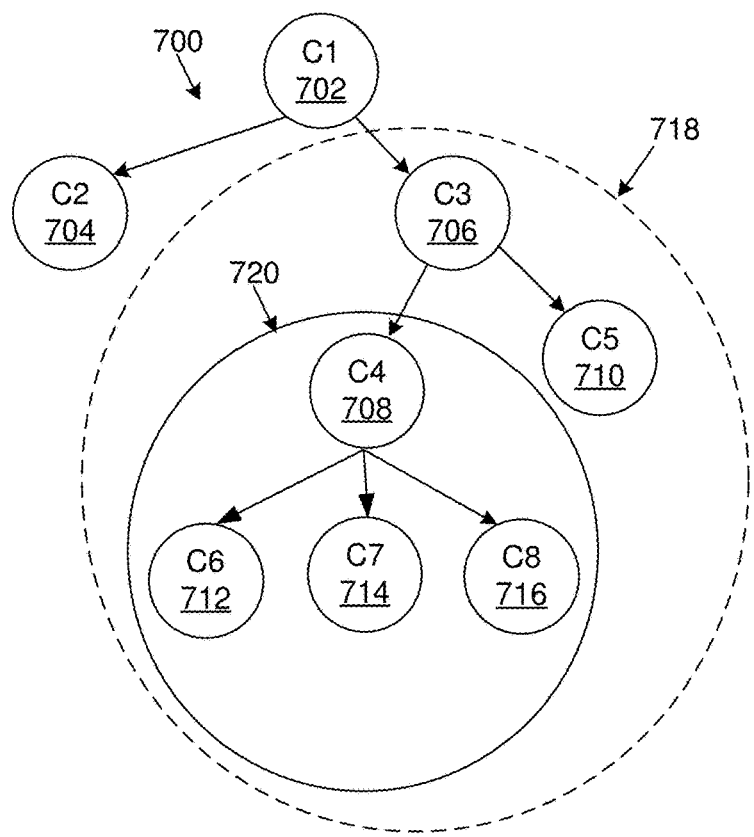
FIG. 7A and FIG. 7B are an example of a tree of conditions, in accordance with one or more embodiments.

A general example of a condition defined by a hierarchical tree is shown in FIG. 7A. Further, specific pseudocode examples of conditions are shown in FIG. 10A, FIG. 10B, and FIG. 10C.

Multiple conditions, i.e., Condition A (206) and Condition B (208), are shown for the surface (204) because a surface need not be defined strictly by one condition, one name list, and one rule. A surface (204) may include multiple conditions, each of which has multiple name lists, and each of the multiple name lists having multiple rules. This structure is explained in further detail with respect to FIG. 7A and FIG. 7B.

Figure 7B:
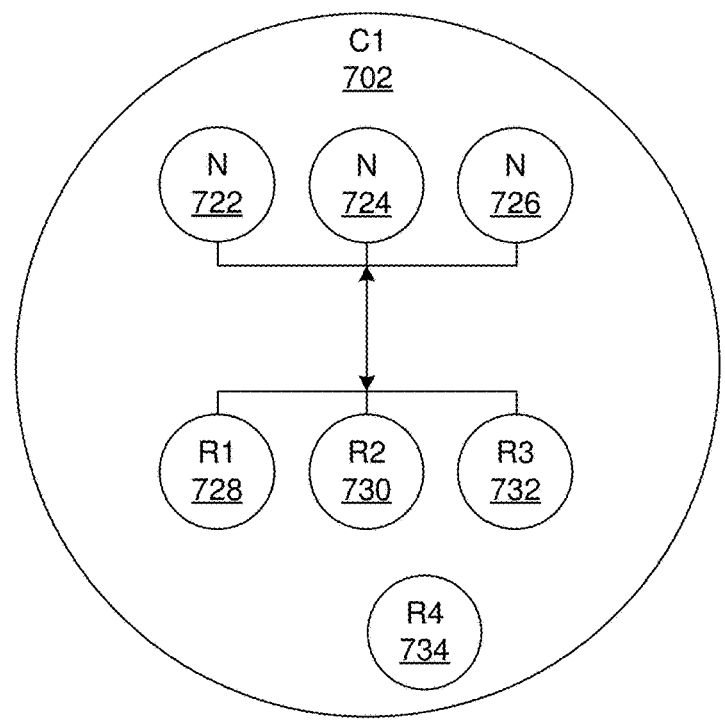

Thus, for example, Condition A (206) may include Name List A (210) and Condition B (208) may include Name List B (212). Each name list is a definition or index of a set of rules that exists for a particular condition. Thus, for example, Condition A (206) has a Name List A (208), which specifies multiple rules, including Rule A (214) and Rule B (216). Similarly, Condition B (208) has a Name List B (212), which specifies multiple rules, including Rule C (218) and Rule D (220). A general example of a name list serving as an index of rules within a condition is shown in FIG. 7B. Specific pseudocode examples of name lists are shown in FIG. 11.

In turn, each rule, such as Rule A (214), Rule B (216), Rule C (218), and Rule D (220) is a specific set of instructions to a computer to render some atomic aspect of an image, possibly down to the individual pixel level. The term "atomic" aspect means that a rule represents an instruction for which it would be undesirable to break the instruction down into multiple smaller instructions. The term "undesirable" is determined from the point of view of a software engineer who builds or defines the data structure (202). For example, a rule may be as specific as defining a single pixel to be yellow. However, a rule may be broader, such as to draw an outline of a shape on the GUI. A general example of a rule indexed by a name list rules within a condition is shown in FIG. 7B. Specific pseudocode examples of rules are shown in FIG. 12.

Again, a particular set of one or more conditions, one or more name lists, and one or more rules define a surface within the data structure (202). Each surface represents a possible configuration for the document or template, such as that shown in FIG. 1. Accordingly, the set of all surfaces within the data structure (202) represents the grant total set of all possible configurations which the document template may have. Because the document or template is defined by the surfaces, the process of updating the document or template is highly flexible by simply designating an updated surface (222) and using a rendering engine, described below, to re-render the document or template using the updated surface (222). In this manner, the updated surface represents an updated configuration of an updated document or template.

Thus, the data repository also may store a template (224) and a revised template (226). However, in an embodiment, the two templates need not be stored at the same time, although they may be stored at the same time. The fact that multiple templates need not be stored simultaneously also accomplishes another one of the technical effects described above.

For example, assume that template (224) has two sections, Section A (228) and Section B (230). Each section has its own configuration defined by a surface of the data structure (202). When a rendering engine (described below) renders the surface, the result is the set of images that are seen by the user in a section on the GUI. In this simple example, Section A (228), being simple text on the template, is defined by a single configuration (204) having a single condition A (206) having a single name list A (210) and a single rule (214). However, Section B (230), being animated graphics, is defined by another configuration which includes multiple conditions, each of the multiple conditions having multiple name lists, and each of the multiple name lists having multiple rules.

In turn, after a user has defined a change to the template, the refused template (226) results. The revised template has the same Section A (228), but now has a different Section D (232). Section D (232) may be a revision to Section B (230) or may be an entirely new section which replaces Section B (230).

Thus, in one embodiment, the template (224) initially exists and is stored in the data repository. However, when the revised template (226) is created, the template (224) is no longer stored, in favor of the revised template (226). Because the revised template (226) is defined only by one or more surfaces of the data structure (202), the amount of storage space used in the computer is reduced compared to storing both templates at the same time. Furthermore, revision from the revised template (226) back to the template (224) is simple, as a mere reversion to the original surface.

Accordingly, many different templates may be "stored" simply by reference to indices stored in the data repository, as opposed to storing the templates and all their definitions individually. For this reason, a single data structure (202) and an indexing scheme (234) described herein is all that is required to define all possible templates that a user may create. Thus, a substantial amount of storage is saved relative to prior template or document creation systems, which saves each configuration separately with each document.

Additionally, the speed of computer action is also increased, because the entire set of sections do not have to be rendered every time a revised template is generated. Instead, only those sections that have changed need to be rendered and updated. Accordingly, the one or more embodiments allow a computer to implement the change from the template (224) to the revised template (226) more quickly than prior document and template generation software systems.

Returning to FIG. 2, an indexing scheme (234) stored on the data repository (200) defines the relationships between conditions, name lists, and rules for any given surface (204). The indexing scheme indexes provides a reference for any particular datum with respect to the data structure (202), as well as the relationship of a datum with other data within the data structure (202). The indexing scheme (234) therefore may be used to identify any surface (240) which, when rendered, results in a particular template, such as the template (224) or the revised template (226).

The data repository (202) is in communication with other components of the system via a network (236). The network (26) may connect computers in a distributed computing environment. Thus, for example, a remote user device (238) need not store the data structure (202). Rather, the data respiratory (200) storing the data structure (202) may be remote from the remote user device (238). In an embodiment, multiple remote user devices may communication with the data repository (200); thus, the network (236) may also allow communication with a different remote user device (240).

Each remote user device may include its own GUI for displaying its own version of the template (224) and/or the revised template (226) on a remote display device. Thus, remote user device (238) includes graphical user interface (242), and remote user device (240) includes graphical user interface (244). Each graphical user interface may display a set of document editing tools, the functionality of which is governed by a computing device (246). Thus, user manipulation of the document editing tools in each graphical user interface results in an instruction, such as instruction (248) or instruction (250), from the corresponding remote user device. The instruction is configured cause the computing device (246) to produce the revised template (226). This process is described with respect to FIG. 8A and FIG. 8B.

The computing device (246) may be a server computer which is configured to communicate with the remote user devices and the data repository (200). The computing device (246) may be configured to receive an input from a remote user device, such as the remote user device (238) or the remote user device (240). The input may be a change to the particular template (e.g., template (224)) displayed on a GUI of the corresponding remote user device.

The computing device (246) is configured execute a reconfiguration engine (252). The reconfiguration engine (252) is configured to receive the input and generate a revised configuration (e.g. revised template (226)) by identifying an updated surface (e.g. updated surface (222)) within the data structure (202) that corresponds to input, as determined using the indexing scheme (234). In other words, the reconfiguration engine (252) may be software or application specific hardware that uses the indexing scheme (234) to reference different surfaces within the data structure (202) of the data repository (200).

The system also includes a rendering engine (254) that may execute on the computing device (246). The rendering engine (254) may take the form of software or application specific hardware which may take, as input, the surface (204) and output a rendered image on a graphical user interface (either or both of GUI (242) or GUI (244)). In an embodiment, the rendering engine (254) may be external to the computing device (246), and thus may be executed on some other computer or server. In any case, the rendering engine (254) is in communication with the reconfiguration engine (252) and the remote user device (238 or 240). The rendering engine (254) is configured to render a particular configuration as a particular template on the GUI (242, 244) and to render the revised configuration (e.g. updated surface (222)) as a revised template on the corresponding graphical user interface (either GUI (242) or GUI (244)).

FIG. 3 is an alternate or complementary system to the system shown in FIG. 2 for editing documents using a single data structure. In the system shown in FIG. 3, a customization user interface (300) shows widgets for manipulating a template or document, as well as possibly the current state of the template or document. The customization user interface (300) may communicate with an application server (320), a rendering library (304), and a reconfiguration engine (306).

The rendering library (304) stores rules or software for rendering virtual objects on the customization user interface (300). The rendering library (304) may include, for example, the indexing scheme described above.

The application server (302) contains software for receiving document manipulation input from the customization user interface (300) and for executing the reconfiguration engine (306). The application server (302) may be remote from the computer which executes the customization user interface (300).

The reconfiguration engine (306) may also be termed surface logic, because the reconfiguration engine (306) is software configured to use the indexing scheme to determine which new surface in the data structure will conform to the required data which, when rendered, results in the updated template or document.

The reconfiguration engine (306) and the application server (302) may be in communication with the data repository (308). The data repository (308) stores the data structure and may, optionally, store the indexing scheme as well.

The reconfiguration engine (306) may also be in communication with a document converter (310). The document converter (310) is software and/or application specific hardware configured to convert a template or form being displayed on the customization user interface (300) into a different kind of file. For example, the form or template being displayed by means of the application server (302) and the rendering library (304) may be converted into a portable document format (PDF) file, a word processing file, a hypertext transfer markup language (HTML) file, etc., using the document converter (310).

Although converting the displayed document or template into a different file type results in a file which stores its own set of definitions for each file, a user may consider such a file to be useful. For example, while a document or template displayed according to the techniques described with respect to FIG. 8A and FIG. 8B using the systems shown in FIG. 2, FIG. 3, and FIG. 4 may have certain advantages from a computer science perspective, a user may desire the portability of a PDF file. For example, once a document or template has been produced using the customization user interface (300), the user may wish to email a PDF version of a document to some outside computer system capable of reading the PDF file, but not capable of using the systems shown in FIG. 2, FIG. 3, and FIG. 4.

Attention is now turned to FIG. 4. FIG. 4 is an alternate system to the systems shown in FIG. 2 and FIG. 3 for editing documents using a single data structure.

In the system shown in FIG. 4, a user (400) interacts with a graphical user interface (402) via user input devices (e.g., keyboards, mice, touch screens, voice activate controls, etc.) The graphical user interface (402) includes user interface (UI) components (404). The UI components (404) include widgets for manipulating a document or template. The document or template is defined by UI data (406) which is rendered via a renderer (408). The renderer (408) may be part of the same computer which executes the graphical user interface (402) but may also be a remote computer. The UI data (406) is obtained from data storage, as described below.

Optionally, the system may include a template store (410). The template store (410) may store templates or documents which have been converted to different file types (e.g., PDF, word processing document, a HTML file, etc.).

The graphical user interface (402) and, if present, the template store (410) may be in communication with a service layer (412). The service layer (412) is software and/or hardware which facilitates electronic communication between the graphical user interface (402) (or the template store (410)) and the remote aspects of the system.

Thus, the service layer (412) is in communication with the data storage (414), which in this example is external to the computer which executes the graphical user interface (402). The data storage (414) may store a data structure (416), which is a multi-dimensional data structure, as described with respect to FIG. 2. The data storage (414) also may store user preferences (418) which may be applied when the user (400) requests a change to a document or template.

The data storage (414) may also store multiple multi-dimensional data structures, each dedicated to creating a different type of form. Thus, for example, different multi-dimensional data structures may be stored for company forms (420), transaction forms (422), report forms (424), and tax forms (426). However, in embodiments, a single data structure may be provided which may be extended to any kind of form.

When the user (400) generates a request via the UI components (404) to change a document or template, the request is passed through the service layer (412) to an orchestration layer (428). The orchestration layer (428) is software and/or hardware configured to perform the computational work of using an indexing scheme to access the correct surface from the data structure (416) which, when rendered, results in the updated template for the form.

The output generator (430) is hardware and/or software configured to receive the updated surface. The output generator (430) is further configured to transmit the surface to the service layer (412) and to the renderer (408). The renderer (408) then renders the surface into UI data (406) which may then be displayed on the graphical user interface (402).

Figure 5:
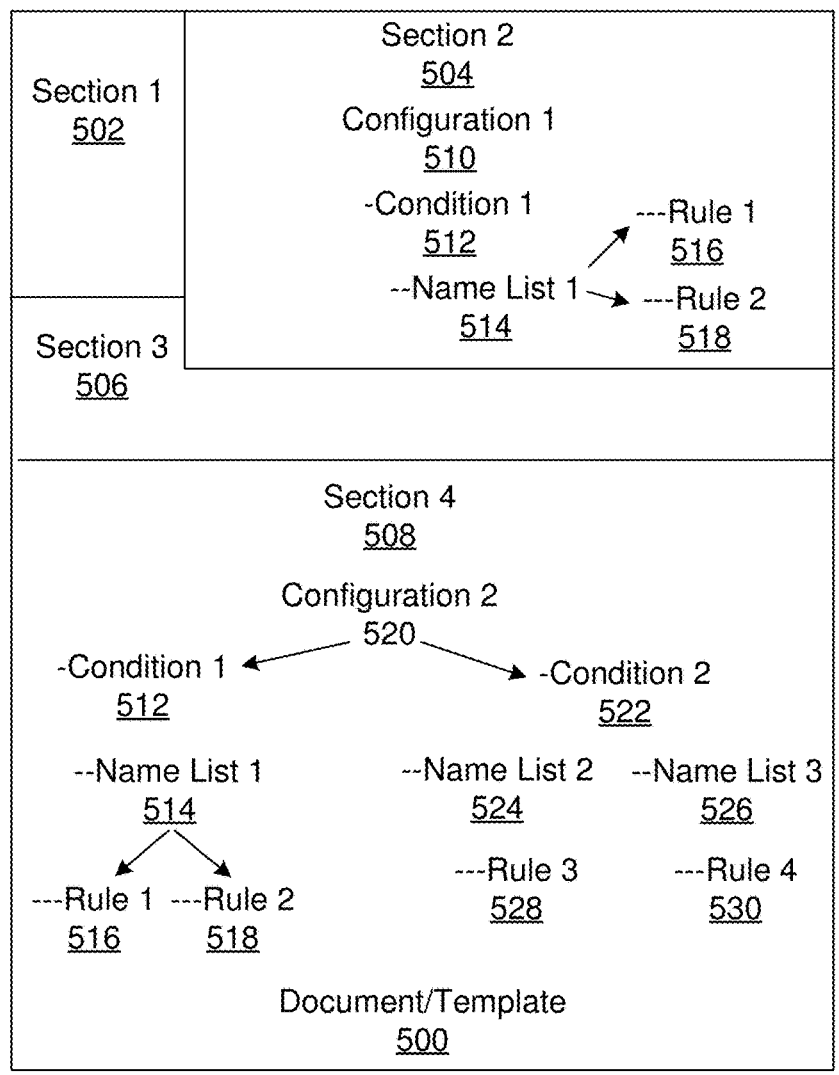
FIG. 5 is a more detailed view of a form displayed on a graphical user interface, in accordance with one or more embodiments.

FIG. 5 is a more detailed view of a form displayed on a graphical user interface, relative to FIG. 1, and shows how data surfaces are used to render sections on the form, in accordance with one or more embodiments. In this example, document/template (500) of FIG. 5 is document or template (104) shown in FIG. 1. Thus, relative to FIG. 1, Section 1 (502) corresponds to Section 1 (110), Section 2 (504) corresponds to Section 2 (112), Section 3 (506) corresponds to Section 3 (114), and Section 4 (508) corresponds to Section 4 (16).

The purpose of FIG. 5 is to show exemplary arrangements of conditions, name lists, and rules for a given configuration. More detailed information discussing conditions, name lists, and rules is provided in FIG. 7A and FIG. 7B, with specific examples of conditions, name lists, and rules provided in FIG. 10A through FIG. 12.

Each of the sections shown in FIG. 5 has its own configuration. For purposes of brevity of illustration, only, the configurations for Section 1 (502) and Section 3 (506) are not shown. However, Section 1 (502) and Section 3 (506) are assumed to have their own configurations having similar structures to those described with respect to Section 2 (504) and Section 4 (508).

Turning first to Section 2 (504) of the document/template (500), the objects and images displayed in Section 2 (504) are defined by a surface of a multi-dimensional data structure. The surface is retrieved from the multi-dimensional data structure via an indexing scheme. For example, when the user specifies a change to the Section 2 (504), software will use the indexing scheme to identify what information in the multi-dimensional data structure will constitute the updated surface.

The surface for Section 2 (504) is Configuration 1 (510). Configuration 1 (510) is defined by one condition, Condition 1 (512) in this example. Condition 1 (512) has one name list, Name List 1 (514) in this example. The Name List 1 (514) has two rules in this example, Rule 1 (516) and Rule 2 (518).

However, the relatively simple arrangement of conditions, name lists, and rules shown in Section 2 (504) may be simpler (such as by including only one rule) or more complex. Section 4 (508) shows a more complex version of a configuration.

Thus, Configuration 2 (520) includes two conditions, Condition 1 (512) and Condition 2 (522). Note that Condition 1 (512) in Configuration 2 (520) is the same as Condition 1 (512) in Section 1 (510). Thus, in Configuration 2 (520), Condition 1 (512) also includes Name List 1 (514), which in turn includes Rule 1 (516) and Rule 2 (518).

In addition, as noted, Configuration 2 (520) also includes Condition 2 (522). In turn, Condition 2 (522) includes two name lists, Name List 2 (524) and Name List 3 (526). In this specific example, each Name List only has one rule apiece. Thus, Name List 2 (524) includes Rule 3 (528), and Name List 3 includes Rule 4 (530).

The arrangement of sections and configurations shown for document/template (500) may be varied. More or fewer sections may be present. Each section may have more than two conditions. Each condition may have more than two name lists. Each name list may have two or more rules. Thus, the examples shown in FIG. 5 do not necessarily limit the claimed inventions or the other examples described herein.

Figure 6:
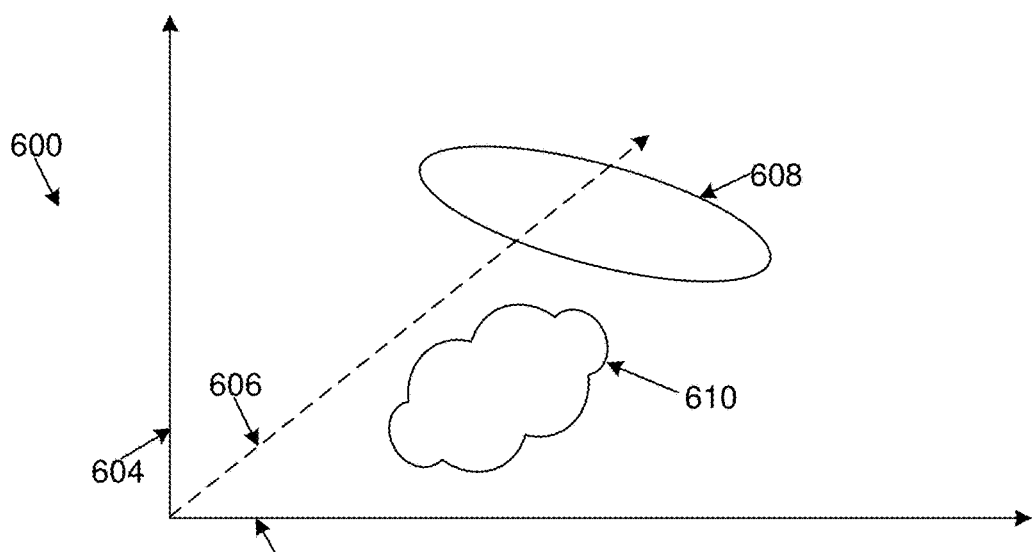
FIG. 6 is an example of a data structure and surfaces in the data structure, in accordance with one or more embodiments.

FIG. 6 is an example of a data structure and surfaces in the data structure, in accordance with one or more embodiments. In particular, multi-dimensional data structure (600) is defined by three axes, first axis (602), second axis (604), and third axis (606). Each axis represents a type of data. For example, first axis (602) may represent conditions, second axis (604) may represent name lists of rules, and third axis (606) may represent the rules.

Alternatively, each axis may represent some other data by data type. For example, the first axis (602) may represent definitions of colors which are useable by a rendering engine to render a color on a GUI. Additionally, more or fewer axes may be present. Thus, for example, two axes may be present, or more than three axes may be present. Note that axes in more than three dimensions may not be represented easily in a three dimensional graph, though may by using non-dimensional indicators such as, for example, color, gradient, etc. Matrix mathematics may be used to track and manipulate multi-dimensional data structures of any number of dimensions (from one to many dimensions).

The multi-dimensional data structure (600) shows two surfaces, first surface (608) and second surface (610). A surface is a set of at least three data points in the data structure, with each data point reflecting at least one positive value along each axis. Because at least three points are present in a three-dimensional data structure (one per axis), the resulting surface nay be represented as a plane in a three-dimensional structure. Thus, the word "surface" is a convenient way of describing a particular configuration of data points that involve all three axes. Note that for a multi-dimensional data structure with more than three axes, a surface is itself is at least three-dimensional. Thus, for example, a surface of a four-dimensional data structure may be a three-dimensional solid represented on a three dimensional graph.

The multi-dimensional data structure (600) may be viewed as having many surfaces. Each surface represents a configuration of data points which the rendering engine may use to render some graphical element in a section of a document or template. Thus, the multi-dimensional data structure (600), taken as a whole, represents the sum total of all possible configurations of a given document or template. Because the number of such combinations of data points may be exceedingly large (perhaps many more than trillions in a realistic application), the number of surfaces is also exceedingly large. For this reason, the one or more embodiments provide for a document/template editor which is exceptionally flexible relative to known document or template editors, which often rely on a much more limited number of palates or stock images to create a document or template.

In addition, in an embodiment, a surface need not be a contiguous set of points. In other words, for a three-dimensional data structure, a surface need not be two contiguous planes, as shown in FIG. 6. Instead, a surface may be discontinuous. For example, a single surface may be defined as the union of the first surface (608) and the second surface (610), even though these two surfaces are discontinuous relative to each other. Thus, because a surface may be non-contiguous, a much greater number of combinations of data points become possible. In fact, for a realistic data structure, the number of possible combinations is effectively infinite from the point of view of a Human user (though the true number of possible combinations of conditions, name lists, and rules would be a finite, but extremely large, number, such as but not limited to a googol or more).

For convenience, the multi-dimensional data structure (600) may be referred to as a "data cube," whether or not the multi-dimensional data structure (600) is three-dimensional or has axes of equal length. However, the term "perfect data cube" would refer to a three-dimensional data structure having axes of equal length (i.e., the same number of data points along each axis).

A surface may be broken down into many logical parts. A logically broken surface can represent a section. The surface may be small, such as to define a single pixel in the GUI, or large, such as to define a table or an address block in the GUI. The surface can also be a discontinuous graph. Thus, the table may have a surface that is continuous or discontinuous during rendering. Note that three aspects of a surface are externalized: conditions, rules and name-lists.

Attention is now turned to an indexing scheme useful for relating data elements in the data structure. Indexing for conditions may be relatively straightforward. Conditions may be labeled as integers (e.g., from 1 to N).

In one or more embodiments, rules may be labeled as map <"rank", "probability">. In this case, "rank" is a manually calculated number (or calculated using machine learning algorithms) or a number adjusted after a manual check on the value for suitability to the application. A higher rank denotes a more important rule. A very low ranked rule may be ignored or has a very little impact on the view or change on the form rendered in the GUI. The "probability" depends on the conditions to which the rule belongs. The probability may be expressed as a fractional percentage value calculated using another machine learning algorithm or manually adjusted number after a manual check.

Name-lists may be indexed after picking up the most applicable or important key-value set. For example, a font-color indexing may be labeled as starting from x000000 to xFFFFFF, where "xFFFFFF" refers to the font-family, and labeled as numeric values (0 to 10). Similarly, defined positions of elements in the form may be defined for a position, such as a right-top position, for custom-positions, and for custom-styles. The objects in the position may be labeled as natural numbers with calculated or manual adjustments (−n to +n).

In addition, name-lists may be lists of styles and positional data belonging to high ranked rules. Since a list may have multiple key-value of styles data, the list may be super imposed to each other if multiple name-lists are applied to a same section in a document. For example, say one section had multiple font-colors and font-types. In this case, the section may pick up the most important (highly ranked) rules only. Hence, one key-value may be indexed as the most valuable or important name: key-value pair.

FIG. 7A and FIG. 7B are an example of a tree of conditions, in accordance with one or more embodiments. In particular, FIG. 7A represents the overall tree of conditions (700), beginning with root condition C1 (702). FIG. 7B shows the details of one particular condition (condition C1 (702)). The tree of conditions (700) is an example of a surface, such as first surface (608) or second surface (610) shown in FIG. 6 and useable as a configuration for defining a section of a document template, such as shown in FIG. 5 using the systems shown in FIG. 2 through FIG. 4. Thus, tree of conditions (700) is an example of a configuration that is more complex than either Configuration 1 (510) or Configuration 2 (520) of FIG. 5. Specific examples of conditions, name lists, and rules are given in the pseudo-code shown in FIG. 10A, FIG. 10B, FIG. 10C, FIG. 11A, FIG. 11B, FIG. 11C, FIG. 12A, and FIG. 12B.

Turning first to FIG. 7A, the tree of conditions (700) begins with a root condition, condition C1 (702). Condition C1 (702) has two dependent conditions, condition C2 (704) and condition C3 (706). Condition C3 (706) includes two sub-conditions, condition C4 (708) and condition C5 (710). In turn, condition C4 (708) includes three sub-sub-conditions, condition C6 (712), condition C7 (714), and condition C8 (716).

Turning back to FIG. 5, it was noted that a given configuration, such as configuration 2 (520), may have more than one condition. In fact, as shown in FIG. 5, a configuration may have multiple conditions, with each of the conditions being its own hierarchical tree of conditions.

However, it is also possible that a second hierarchical tree of conditions (e.g., condition 2 (522) of FIG. 5) may be considered a sub-tree of the overall tree of conditions (700). Returning to FIG. 7A, a sub-tree of conditions also may be considered a second hierarchical tree of conditions. Thus, for example, first sub-tree (718) and second sub-tree (720) each may be considered their own additional trees of conditions for use in a section of a template, such as that shown in FIG. 5.

Turning now to FIG. 7B, the details of condition C1 (702) are shown. Condition C1 (702) is defined by several name list of rules, including name list N (722), name list (724), and name list (726). The condition C1 (702) is also defined by several rules, including rule 1 (728), rule 2 (730), and rule 3 (732). Rule R4 (724) is shown without a name list in order to show that, in some cases, particularly where only a single rule is involved, a name list of rules might not be necessary for every condition. Additionally, not all name lists need be associated with rules, and vice-versa. On the other hand, as described more fully below, name lists and rules may have a many-to-many relationship. Therefore, each of name list (722), name list (724), and name list (726) may relate any or all of rule 1 (728), rule 2 (730), and rule 3 (732), and vice-versa.

Additional description of the relationships between conditions, rules, and name lists is now provided. As indicated above, name lists and rules have many-to-many relationships, where multiple name lists each relate to multiple rules, and vice versa. In other words, one name list may be referred or used by multiple rules. Likewise, a rule may operate on multiple name lists. If rules are actions, then name lists are the data sets for those actions to operate upon. Stated differently, rules are like instructions and name lists are data that are constant inside those instructions. Accordingly, data represented by a name-list are not changed inside the rule that is operating on the data.

Attention is now turned to describing why a name list may be used, as described above, instead of simply listing the rules for a condition. Name lists are used to break down and relate the underlying data into a modular and manageable data structure. Separating actions (rules) from data (name lists) conveys the ability to represent both actions (the rules) and data (the name lists) in a mathematical way. For example, rules may be a discontinuous series of natural numbers, and a number may denote the importance of that rule.

Name lists may be a set of key value pairs. Thus, a name list may have an evaluation criterion, but at the end of the calculation, the name list may refer to a natural number.

If both rules and name lists are kept together, then one would not be able to make a modular mathematical representation, or do so far less efficiently. Fewer variations of that data (i.e., surfaces) results. In turn, fewer variations means less flexibility and a less abstract data structure. As an example consequence, without the condition—rule—name list arrangement, a two-dimensional projection of a three-dimensional space could result in some loss of data.

Returning to FIG. 7, each condition shown in tree of conditions (700) may have its own corresponding set of one or more name lists and one or more rules, arranged in a manner similar to or different than the arrangement shown in FIG. 7B. Thus, the logical structure of any given configuration may be complex but is definite.

In an embodiment, the rendering engine may be instructed to apply conditions in the order indicated in the hierarchical tree. Thus, for example, a rendering engine may apply condition 1 (702) first, then apply condition 2 (704), and condition 3 (706) in parallel. Apply condition 3 (706) may be accomplished by applying condition 4 (708) and condition 5 (710) in parallel, but condition 4 (708) is accomplished by applying condition 6 (712), condition 7 (714), and condition 8 (716) in parallel.

Figure 8A:
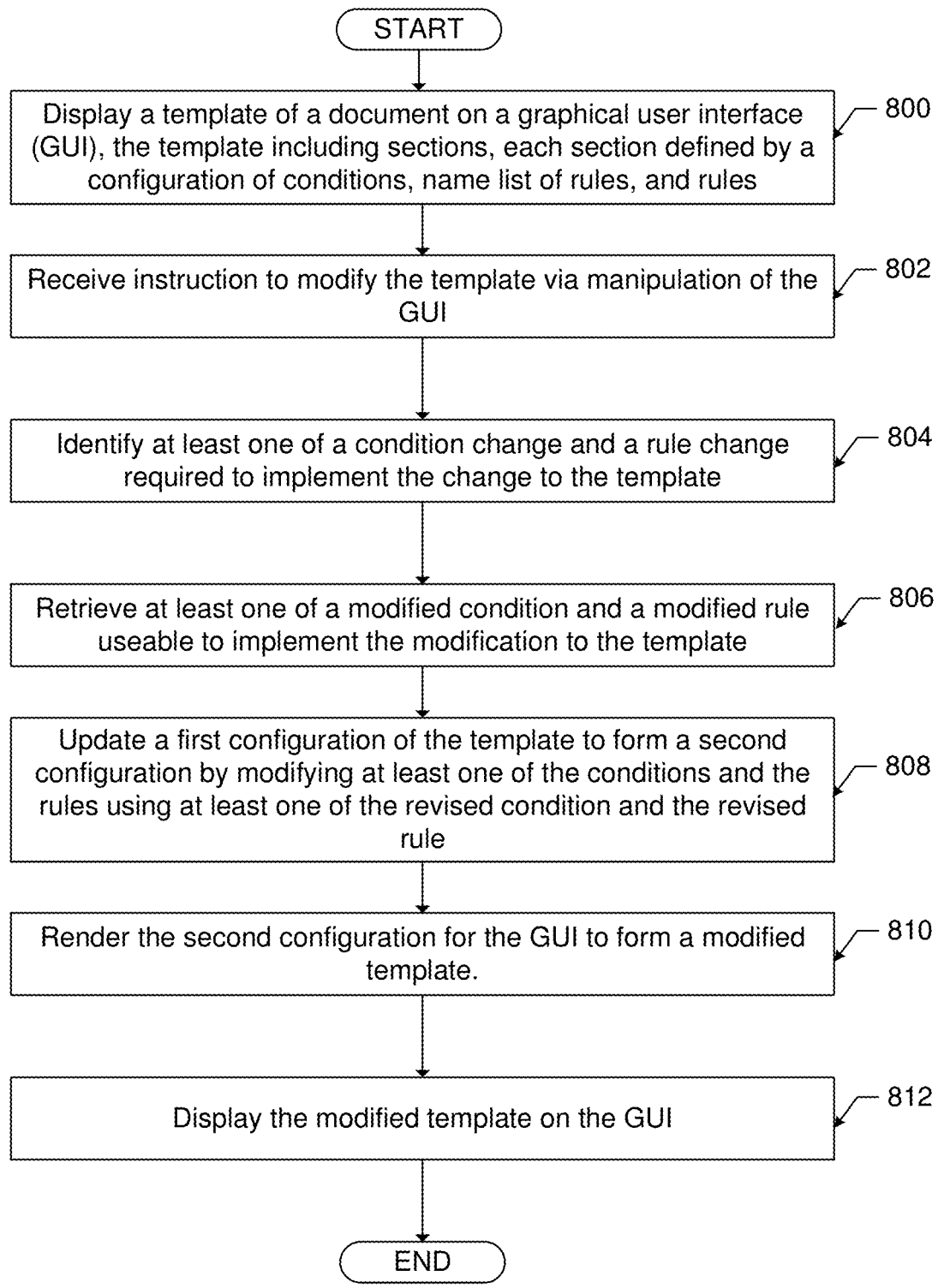
FIG. 8A and FIG. 8B are methods of editing, rendering, and displaying a form on a graphical user interface, in accordance with one or more embodiments.
Figure 8B:
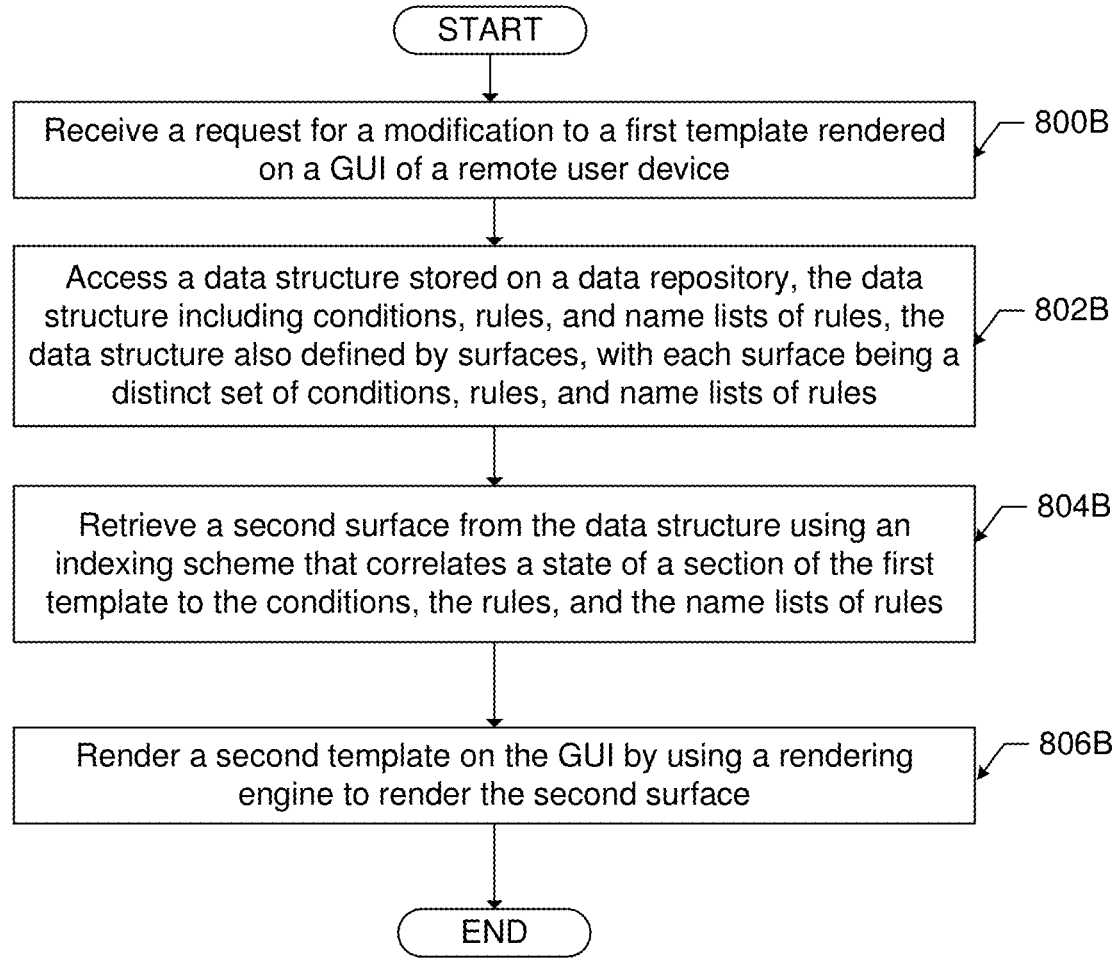

FIG. 8A and FIG. 8B are methods of editing, rendering, and displaying a form on a GUI, in accordance with one or more embodiments. The methods shown in FIG. 8A and FIG. 8B may be performed using different systems, such as the systems shown in FIG. 2, FIG. 3, and FIG. 4. The methods shown in FIG. 8A and FIG. 8B may be implemented using a computing system, possibly in a distributed computing environment, such as those shown in FIG. 13A and FIG. 13B.

At step 800, a template of a document is displayed, the template including sections, each section defined by a configuration of conditions, name lists of rules, and rules. The template may be displayed using a rendering engine which includes software and/or application-specific hardware for reading the conditions, name lists of rules, and the rules and converting their instructions into an image to be displayed on a GUI.

Note that in some embodiments, the name lists of rules need not be present. For example, if only one or a few rules are present in a condition, then a name list of rules may be foregone in favor of a reference which logically connects the condition to the rule itself.

With respect to the configuration may be termed a first configuration. The first configuration is defined by conditions. The conditions are defined by rules. Each of the sections is defined by a distinct set of conditions. Each of the conditions is defined by a distinct set of rules. If present, the conditions may be further defined by name lists which index the rules.

The first configuration, the plurality of conditions, the plurality of name lists (if present), and the plurality of rules may be stored separately from the template and from each other. The storage of the conditions, name lists, and rules are separate from the template in the sense that the surface is stored by the computing device or in the data repository, whereas the template is merely rendered on the remote user's computer. The conditions, name lists, and rules are stored separately from each other in the sense that they are not stored individually and associated individually with the template, but rather are indexed as a surface which is referenced to the multi-dimensional data structure. This separation between where a surface is stored and where any template is rendered aids with the flexibility of using the systems disclosed herein, and with reducing the amount of storage required to produce many different templates.

At step 802, an instruction is received to modify the template via manipulation of the GUI. For example, a user may manipulate the document editing tools (102) shown in the GUI (100) of FIG. 1. The result of manipulating one or more widgets of the document editing tools is an instruction to modify the template. The instruction is received by the computing device, such as computing device (246) of FIG. 2.

At step 804, the computing device identifies at least one of a condition change and a rule change required to implement the change to the template. In other words, the instruction will include data which indicates the type of change to be made to the template. In a specific example, the instruction may be to turn a straight line into a curved line of a defined radius. The computing device is programmed with software and/or application-specific hardware to use that data in conjunction with an indexing scheme to search the multi-dimensional data structure for a surface which will include the conditions, name lists, and rules which the rendering engine may use to implement the desired change from a straight line to a curved line.

Attention is now turned to an example of how a computing device is able to determine which surface to use in the multi-dimensional data structure upon receiving an instruction to change an image in a section of a template. As indicated above, mathematical models are stored along with actual values of the conditions, rules, and name lists.

All required important disconnect surfaces are stored as external data (that includes conditions, rules and name-lists) and templates with sections, based on these models. Hence, in totality, surfaces are indirectly linked through conditions and rules with section identifiers or types.

As a more detailed example, a computing device may render a section as below:
Read Template or embodiment;
Repeat for each section in the embodiment hierarchy;
Run the following algorithm for each surface:
For each point that are mentioned on a first model on the surface:
Read all conditions for the section;
Repeat for each condition;
Read a rule and its values from a second model;
If a rule has low rank, discard the rule;
Repeat for each highly ranked rule in the second model:
Pull up name lists for the rule;
Execute the rule using name lists from a third model;
For each key values of the name-lists in the rule:
Apply a name-list on the rule.
END.
Note that Models may be edited to impact the quality and the look of the entire document.

Returning to FIG. 8, at step 806, the computing device retrieves at least one of a modified condition and a modified rule to implement the modification to the template. Retrieval is from a data storage device. The modified rule and the modified condition may take the form of a surface of a multi-dimensional data structure stored on the data storage device. The surface may also include a name list of rules.

At step 808, the computing device updates a first configuration of the template (the original template, prior to the desired changes), to form a second configuration by modifying at least one of the conditions and the rules using at least one of the revised condition and the revised rule. Again, a revised configuration may also include a revised name list. Updating may be accomplished by replacing the configuration (surface) originally designated to be applied to a section with the updated configuration (surface).

Then at step 810, the rendering engine renders the second configuration for the GUI to form a modified template. Rendering may be performed by applying the revised configuration of conditions, name lists (optionally), and rules to the rendering instructions. The procedures and software for rendering an image on a GUI is otherwise known in the art.

At step 812, the modified template may be displayed on the user device. In this manner, the user may see the changes that the user had requested in the template.

Note that the modified template is not stored, as such, at the remote user device or at the computing device. Instead, the newly modified surface is rendered and then displayed on the user interface of the remote computing device. If the user wanted to create another template, or further modify the template, a new surface is generated and rendered.

It is possible to save a reference to each surface in a cache stored either on the data repository or in the computing device. Thus, a user may quickly revert back and forth among various template changes, such as with a "back" or "undo" button on the interface tools. However, storing the set of surfaces themselves is unnecessary. All that is required is that an indexing reference to the set of surfaces is stored, and the surfaces may be called for use when needed. In this manner, the entire definition (i.e., set of all surfaces used to render all sections of a template) of a template need not be stored for every template. Rather, only the indexing references need be stored. Accordingly, the one or more embodiments are highly efficient with data storage, and also with the speed of computation to render new changes to a template.

Thus, for example, the method shown in FIG. 8 may be extended. For example, the first configuration may be stored as a first surface of a three-dimensional data object. The first surface includes a subset of a grand total space of all conditions, rules, and rule name lists in the three-dimensional data object. The second configuration may be stored as a second surface of the three-dimensional object. Alternatively, only the indexing reference to the second surface need be stored.

In another variation, the first configuration may be stored as a first hierarchical tree of conditions. In this case, the second configuration may be stored as a second hierarchical tree of conditions.

Because the one or more embodiments use configurations to specify a configuration of a specific sections of a template, the one or more embodiments also contemplate selectively adjusting a first section of the various sections by modifying at least one of the conditions for the first section and the rules for the first section. Likewise, a second section of the plurality of sections may be adjusted by modifying at least one of the conditions for the second section and the rules for the second section.

The one or more embodiments also support networked, simultaneous collaboration between multiple users. For example, a first user may adjust the first section while a second user adjusts the second section. Because the two sections of the template are considered separate from each other, the two users may work on the two sections simultaneously. In this manner, the speed of template creation may be further increased.

Because the one or more embodiments contemplate multiple simultaneous users being able to modify the template, it may be useful to provide those users with different security levels for authorization to modify some but not all of the sections of the template. Thus, the method may also include locking a section of the template to a particular user, or to restrict a particular user from modifying a section. Additional security may be provided by restricting users from using certain surfaces, certain conditions, certain name lists, or certain rules. Thus, for example, a section may be locked by encrypting at least one rule.

Once the template has been created, it may be possible to convert the modified template into a different file type. For example, it may be advantageous for the use to publish the satisfactory form as a PDF document in order to publish it to the general public. Thus, the one or more embodiments contemplate converting the modified template to at least one of a group including a portable document format (PDF), a text format, a hypertext markup language (HTML) format, an image file, and a word processing format. The image file may be in any convenient file format, such as but not limited to JPEG (joint photographic experts group), PNG (portable network graphic), TIF (tagged image file), GIF (graphical interchange format), etc.

Attention is now turned to FIG. 8B. The method shown in FIG. 8B is an alternative method to the method shown in FIG. 8A and may be accomplished using similar systems and objects.

At step 800B, a request is received for a modification to a first template rendered on a GUI of a remote user device. The request may be received as a result of a user manipulating document editing tools, such as those shown in FIG. 1. The request may be transmitted over a network to a computing device that is remote from the user computer which is displaying the first template.

At step 802B, a data structure stored on a data repository is accessed. The data repository includes conditions, rules, and name lists of rules, and further defined by surfaces, with each surface being a distinct set of conditions, rules, and name lists of rules. The data structure may be the multi-dimensional data structure shown in FIG. 6. The data structure may be accessed using an indexing scheme, as described above.

Likewise, at step 804B, a second surface is retrieved from the data structure using an indexing scheme that correlates a state of a section of the first template to the conditions, the rules, and the name lists of the rules. Then at step 806B, a second template is rendered on the GUI by using a rendering engine to render the second surface, as described above.

FIG. 9A, FIG. 9B, FIG. 9C, and FIG. 9D are examples of forms constructed using the data surfaces described in FIG. 6, in accordance with one or more embodiments. Each of the forms shown in FIG. 9A through FIG. 9D also may be referred to as templates or documents. Each of the forms shown in FIG. 9A through FIG. 9D may be created using the system shown in FIG. 2 through FIG. 4 using the methods described with respect to FIG. 8A and FIG. 8B.

Figure 9A:
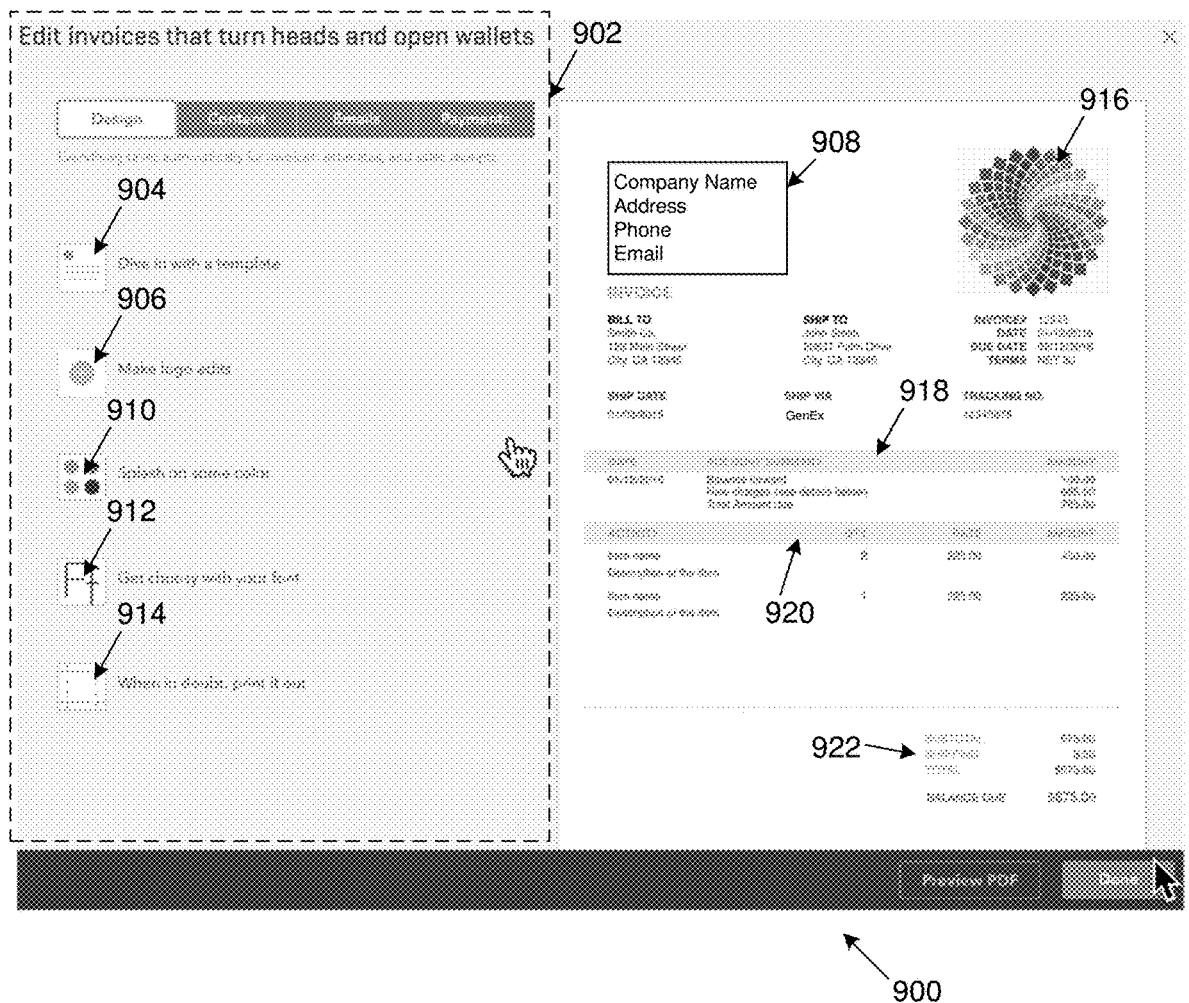

FIG. 9A shows a variation of FIG. 1. For example, the GUI (900) shows the document editing tools within a dotted line box (902). For example, template widget (904) may be selected which allows a user to call up a pre-selected template for further editing, rather than begin creating a template form from scratch. Section widget (906) allows the user to edit a particular section, in this case to edit section including the user-defined text block (908). A color widget (910) may allow a user to change various colors in various different sections. A font widget (912) may allow a user to edit the font type used, or to create next text. A print widget (914) may be used to either print the form, to change the form to a new file type, or to show on the GUI how the form will look when sent to a physical printer.

As indicated above, the user-defined text block (908) may be a section of the form. Other sections of the form may be present, such as a user-defined logo (916) which may be edited using the color widget (910) and/or other widgets in the document editing tools. The form may include many different sections, such as an account summary section (918), an activity section (920), a total section (922), and possibly more. Each section is defined by its own surface of the underling multi-dimensional data structure, with any given surface being a set of configurations, name lists, and rules.

FIG. 9B shows another form (or document or template) created using the one or more embodiments described above. Form (900B) has some similar sections. For example, activity section (902B) is similar to activity section (920) in FIG. 9A. However, columns for "date" and "due" have been added using the document editing tools. Thus, activity section (902B) in FIG. 9B is an example of a modified section, relative to activity section (920) in FIG. 9A.

The modification of the activity section is accomplished by, initially, by the user actuating a widget in the document editing tools. The indexing scheme is used to access what surface in the underlying multi-dimensional data structure would be required to accomplish the modified activity section (902B). The modified surface is returned to the rendering engine, which then renders the modified form (900B) as shown in FIG. 9B.

Similar changes may be performed in other sections, such as in text block section (904B) in FIG. 9B, corresponding to user-defined text block (908) in FIG. 9A. Note that one user may have worked on the company logo section (906B) (corresponding to user-defined logo (916) in FIG. 9A) simultaneously with another user working on the modified activity section (902B).

Figure 9C:
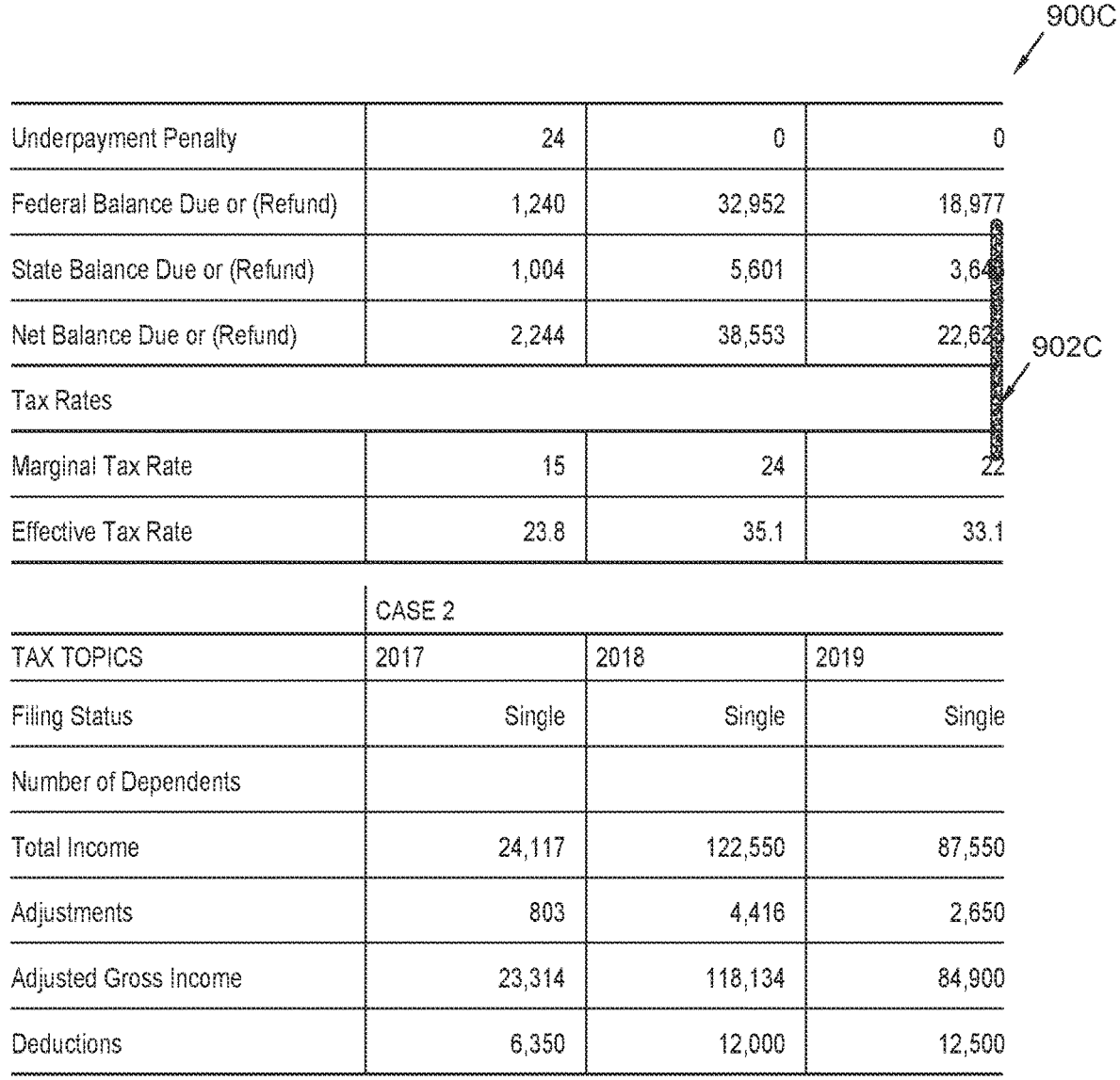

To show the versatility of the one or more embodiments, FIG. 9C and FIG. 9D show very different forms, documents, or templates that may be formed using the techniques described above. For example, form (900C) in FIG. 9C is an interactive form capable of animation. In particular, the surface which defines form (900C) provides a series of conditions, name lists of rules, and rules which, when rendered by a rendering engine, provide an animated document which may moves on the user's screen. A scroll bar (902C) may be used to control the animation. Additionally, the form itself is arranged quite differently, as it is used for tax preparation or tracking of tax information.

In turn, form (900D) shows a form useful for printing on a thermal printer. Thus, the width and length of the form (900D) are specified for a particular model of thermal printer. In this case, the form (900D) was created using a different underlying template, which was retrieved by referring to an index that designated a particular surface of the multi-dimensional data structure which, when rendered, resulted in the form (900D).

FIG. 10A, FIG. 10B, and FIG. 10C are pseudo code showing how configurations may be represented for the forms shown in FIG. 9A through FIG. 9D, in accordance with one or more embodiments. Configuration 1 (1000A) shown in FIG. 10A may be used to designate a tree of conditions suitable for rendering the form shown in FIG. 9B. Configuration 2 (1000B) may be used to designate a tree of conditions suitable for rendering the form shown in FIG. 9C. Configuration 3 (100C) may be used to designate a tree of conditions suitable for rendering the form shown in FIG. 9D.

FIG. 11A, FIG. 11B, and FIG. 11C show examples of name lists of rules. FIG. 11A shows pseudo code showing how name lists may be represented for the forms shown in FIG. 9A through FIG. 9D, in accordance with one or more embodiments.

As shown in FIG. 11A, example 1 (1100A) and example 2 (1102A), name lists may be presented as key-value pairs. A conditional name list may associate a component type to a component name.

As shown in FIG. 11B, example (1100B) shows default name lists in a rule. Thus, FIG. 11B shows that a rule may itself be a name list of rules. FIG. 11B also relates to an example of a cascading style sheets (CSS) type of name list. CSS is a stylesheet language used to describe the presentation of a document written in hypertext transfer markup language (HTML) or extensible markup language (XML). In other words, the software may directly render a form by providing this name list to a CSS interpreter. Note that non-CSS name lists may require a custom interpreter.

As shown in FIG. 11C, example (1100C) illustrates another example of name lists, designated $N_1$, $N_2$, $N_3$, etc. In contrast to FIG. 11B, example (1100C) shows that a name list may, itself, be a rule. In this manner, the arrangement of FIG. 7B with R4 (724) may be accomplished, with a separate rule (or name list) designating a rule itself.

FIG. 12A and FIG. 12B each show pseudo code showing how rules may be represented for the forms shown in FIG. 9A through FIG. 9D, in accordance with one or more embodiments. JAVA® script (1200A) in FIG. 12A shows an example of rules for supporting drag and drop functionality in a form. JAVA® script (1202A) refers to an if/else condition with respect to the rules in JAVA® script (1200A). A first rule in the JAVA® script refers to keeping an aspect ratio the same for a given width and to calculate a variable height. A second rule relates to keeping an aspect ratio the same for a given height and to calculate a variable width.

Rule set (1200B) in FIG. 12B shows an example of rules for specifying custom visualization rules for text and images. Note that in rule $R_{10}$ (1202B) a rule may refer to another condition. Thus, rules may interact with conditions in some embodiments.

The one or more embodiments described herein have a number of technical features that are desirable relative to other methods for creating or editing forms, templates, or other documents. For example, one method for creating or editing a document is by using the hypertext transfer markup language (HTML). However, the one or more embodiments avoid or reduce the use of tags, thereby simplifying the creation or designation of a form. Additionally, each document in HTML is defined by its own separate set of HTML code, leading to data duplication (and hence increased storage requirements) that is avoided through the use of a single multi-dimensional data structure. The one or more embodiments are easy to maintain relative to HTML documents, because instead of having to track any changes in each document, only changes to the single multi-dimensional data structure needs to be made. Additionally, any rendering logic in the one or more embodiments is moved to a single engine, rather than in the tags themselves, as in HTML documents.

Similar benefits are achieved with PDF and word processing files, with respect to associating a definition with each document as opposed to maintaining a central multi-dimensional data structure. Additionally, the one or more embodiments allow for more flexible security through the use of securing individual sections of a document, as desired, as opposed to only securing the entire document (as with PDF and word processing files). Furthermore, the one or more embodiments may be more flexible than PDF and word processing documents, which often limit a user to certain specific templates or images, as opposed to many different combinations of surfaces in the one or more embodiments which lead to increased flexibility in terms of how sections of a document may be adjusted.

Figure 13A:
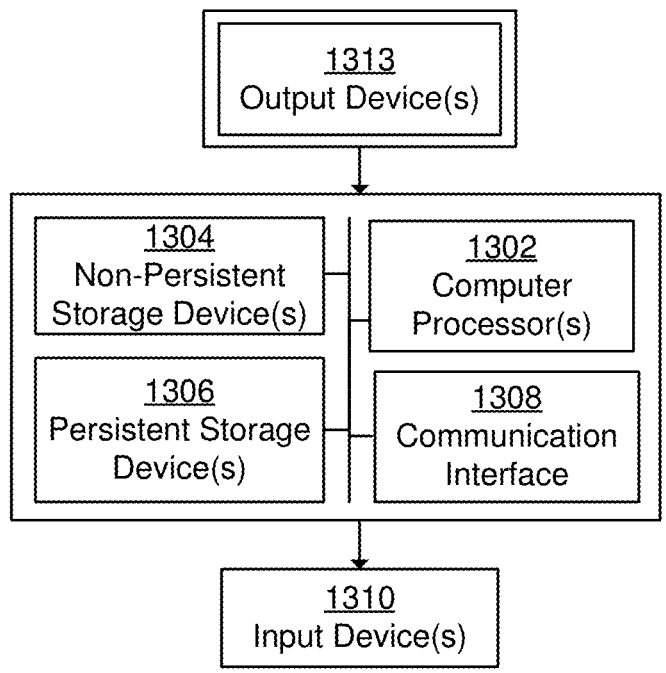
FIG. 13A and FIG. 13B show an example of a computing system and a network environment, in accordance with one or more embodiments.

Embodiments of the invention may be implemented on a computing system. Any combination of mobile, desktop, server, router, switch, embedded device, or other types of hardware may be used. For example, as shown in FIG. 13A, the computing system (1300) may include one or more computer processors (1302), non-persistent storage (1304) (e.g., volatile memory, such as random access memory (RAM), cache memory), persistent storage (1306) (e.g., a hard disk, an optical drive such as a compact disk (CD) drive or digital versatile disk (DVD) drive, a flash memory, etc.), a communication interface (1312) (e.g., Bluetooth interface, infrared interface, network interface, optical interface, etc.), and numerous other elements and functionalities.

The computer processor(s) (1302) may be an integrated circuit for processing instructions. For example, the computer processor(s) may be one or more cores or micro-cores of a processor. The computing system (1300) may also include one or more input devices (1310), such as a touchscreen, keyboard, mouse, microphone, touchpad, electronic pen, or any other type of input device.

The communication interface (1312) may include an integrated circuit for connecting the computing system (1300) to a network (not shown) (e.g., a local area network (LAN), a wide area network (WAN) such as the Internet, mobile network, or any other type of network) and/or to another device, such as another computing device.

Further, the computing system (1300) may include one or more output devices (1308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1302), non-persistent storage (1304), and persistent storage (1306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 13B:
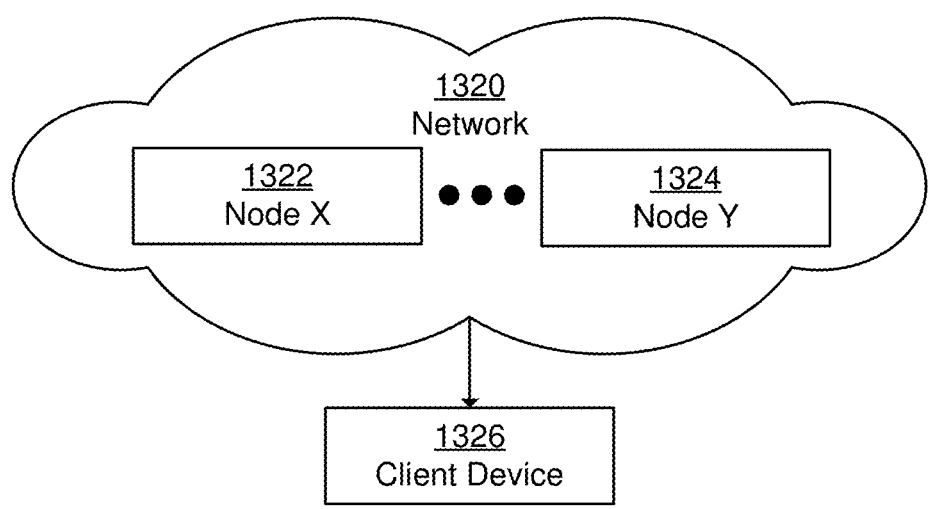

The computing system (1300) in FIG. 13A may be connected to or be a part of a network. For example, as shown in FIG. 13B, the network (1320) may include multiple nodes (e.g., node X (1322), node Y (1324)). Each node may correspond to a computing system, such as the computing system shown in FIG. 13A, or a group of nodes combined may correspond to the computing system shown in FIG. 13A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1300) may be located at a remote location and connected to the other elements over a network.

Although not shown in FIG. 13B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1322), node Y (1324)) in the network (1320) may be configured to provide services for a client device (1326). For example, the nodes may be part of a cloud computing system. The nodes may include functionality to receive requests from the client device (1326) and transmit responses to the client device (1326). The client device (1326) may be a computing system, such as the computing system shown in FIG. 13A. Further, the client device (1326) may include and/or perform all or a portion of one or more embodiments of the invention.

The computing system or group of computing systems described in FIGS. 13A and 13B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a GUI on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 13A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (including of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 13A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 13A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 13A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 13A and the nodes and/or client device in FIG. 13B. Other functions may be performed using one or more embodiments of the invention.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method comprising:
   displaying a template of a document in a graphical user interface, wherein the template comprises a plurality of sections displayed within the template, wherein:
   the plurality of sections comprises at least one configuration including a first configuration,
   the first configuration is defined by a plurality of conditions,
   the plurality of conditions is defined by a plurality of rules,
   each of the plurality of sections is defined by a distinct set of conditions,
   each of the plurality of conditions is defined by a distinct set of rules, and
   the first configuration, the plurality of conditions, and the plurality of rules are stored separately from the template and from each other;
   storing the first configuration as a first surface of a multi-dimensional data object,
   wherein the first surface comprising a subset of a total space of all conditions, rules, and rule name lists in the multi-dimensional data object, and
   wherein the first configuration further comprises a first hierarchical tree of conditions taken from the plurality of conditions;
   receiving an instruction to modify the template via a manipulation of the graphical user interface;
   identifying at least one of a condition change and a rule change required to modify the template;
   retrieving at least one of a modified condition and a modified rule useable to implement the at least one of the condition change and the rule change;
   updating the first configuration by modifying at least one of the plurality of conditions and the plurality of rules using at least one of a revised condition and a revised rule, wherein a second configuration is formed;
   storing the second configuration as a second surface of the multi-dimensional data object,
   wherein the second configuration further comprises a second hierarchical tree of conditions taken from the plurality of conditions, and
   wherein the second hierarchical tree of conditions distinct from the first hierarchical tree of conditions; and
   rendering the second configuration for the graphical user interface to form a modified template; and
   displaying the modified template on the graphical user interface.

2. The method of claim 1, further comprising: associating rules to conditions using an indexing scheme.

3. The method of claim 1, further comprising: selectively adjusting a first section of the plurality of sections by modifying at least one of the plurality of conditions for the first section and the plurality of rules for the first section.

4. The method of claim 3, further comprising: selectively adjusting a second section of the plurality of sections by modifying at least one of the plurality of conditions for the second section and the plurality of rules for the second section, wherein a first user adjusts the first section; and wherein a second user adjusts the second section.

5. The method of claim 4, wherein selectively adjusting the second section creates a third configuration of the template.

6. The method of claim 1, further comprising: locking a section of the plurality of sections by encrypting at least one rule in the plurality of rules.

7. A system comprising:
   a data repository storing a data structure comprising a multi-dimensional data object comprising a plurality of conditions, a plurality of rules, and a plurality of name lists of rules, wherein:
   the data structure further comprises a plurality of surfaces within the data structure,
   the plurality of surfaces comprises distinct configurations for a corresponding template, the plurality of surfaces comprises subsets of the plurality of conditions, the plurality of rules, and the plurality of name lists of rules, and the plurality of surfaces further comprises hierarchical trees of conditions taken from the plurality of conditions;

a computing device configured to receive an input from a remote user device, wherein the input comprises a change to the corresponding template displayed on a graphical user interface of the remote user device;

a reconfiguration engine executing on the computing device and in communication with the data repository, the reconfiguration engine configured to receive the input and generate a revised configuration by identifying an updated surface within the data structure that corresponds to input, the updated surface comprising one of the plurality of surfaces; and a rendering engine in communication with the reconfiguration engine and the remote user device, the rendering engine configured to render a particular configuration as a particular template on the graphical user interface and to render the revised configuration as a revised template on the graphical user interface, wherein the rendering engine is external to the computing device and the remote user device.

8. The system of claim 7, wherein data repository is external to the computing device and the remote user device.

9. The system of claim 7, wherein each node of the hierarchical tree of conditions comprises a corresponding condition, the corresponding condition comprising a corresponding plurality of rules stored as ones of the name lists of rules.

10. The system of claim 7, wherein the corresponding template is stored as a plurality of sections, and wherein: each of the plurality of sections is defined by at least one corresponding configuration, the at least one corresponding configuration comprises at least one corresponding condition, the at least one corresponding condition comprises at least one corresponding rule, the at least one corresponding rule is defined by at least one name list of rules, the data repository further comprises an indexing scheme that defines relationships among the plurality of surfaces, the plurality of conditions, the plurality of rules, and the plurality of name lists of rules.

11. The system of claim 7, wherein the data structure comprises a data cube.

12. A method comprising:

receiving a request for a modification to a first template rendered on a graphical user interface of a remote user device;

accessing a data repository, wherein accessing further comprises:

accessing a data structure comprising a multi-dimensional data object a plurality of conditions, a plurality of rules, and a plurality of name lists of rules, wherein:

the data structure further comprises a plurality of surfaces within the data structure, the plurality of surfaces comprises distinct configurations for a corresponding template, the plurality of surfaces comprises subsets of the plurality of conditions, the plurality of rules, and the plurality of name lists of rules, and the plurality of surfaces comprises hierarchical trees of conditions taken from the plurality of conditions, and accessing at least one of a plurality of surfaces within the data structure, wherein each of the plurality of surfaces comprises a distinct configuration for the first template, the first template renderable on a graphical user interface of a remote user device, wherein:

the first template comprises a first surface of the plurality of surfaces, each surface comprises at least one configuration, each configuration comprises at least one rule, and each rule comprises at least one name list of rules; and retrieving a second surface, of the plurality of surfaces in the data structure, using an indexing scheme that correlates a state of a section of the first template to the plurality of conditions, the plurality of rules, and the plurality of name lists of rules;

rendering a second template on the graphical user interface of the remote user device by rendering the second surface.

13. The method of claim 12, wherein the second surface is useable by an external rendering engine to render a form from the first template.

14. The method of claim 12, wherein the indexing scheme comprises:

at least one rule for each node of the hierarchical tree of conditions; and at least one name list for each rule.

15. The method of claim 14, wherein the indexing scheme further comprises:

a plurality of index values that relate each of the plurality of surfaces to corresponding conditions, corresponding rules, and corresponding name lists for a given surface.

16. The method of claim 12, wherein the first template comprises a plurality of sections, and wherein receiving the request comprises receiving the request to change a first section of the first template, and wherein the method further comprises:

receiving a second request for a second modification to the first template rendered on a second graphical user interface of a second remote user device, wherein the second modification is to a second section different than the first section;

retrieving a second surface, of the plurality of surfaces in the data structure, using an indexing scheme that correlates a state of a section of the first template to the plurality of conditions, the plurality of rules, and the plurality of name lists of rules;

changing the first section of the first template by applying the second surface to the first section of the first template, wherein an updated section is created; and rendering the first template on a graphical user interface using the updated section.

17. A method comprising:

displaying a template of a document in a graphical user interface, wherein the template comprises a plurality of sections displayed within the template, each of the plurality of sections being defined by a distinct set of conditions and rules, the distinct set of conditions and rules being stored separately from the template and from each other, and wherein:

the plurality of sections comprises a plurality of surfaces of a multi-dimensional data object, each of the plurality of surfaces comprises a corresponding one of the distinct set of conditions and rules, and the plurality of surfaces comprises hierarchical trees of conditions taken from the distinct set of conditions;

receiving an instruction to modify the template via a manipulation of the graphical user interface;
identifying at least one of a condition change and a rule change required to modify the template;
retrieving at least one of a modified condition and a modified rule useable to implement the at least one of the condition change and the rule change;
modifying at least one of the distinct set of conditions and the rules using at least one of a revised condition and a revised rule to form an updated surface in the plurality of surfaces;
rendering the graphical user interface based on the at least one of the revised condition and the revised rule in the updated surface to form a modified template; and
displaying the modified template on the graphical user interface.

\* \* \* \* \*